(12) United States Patent
Harding et al.

(10) Patent No.: US 12,466,801 B2
(45) Date of Patent: Nov. 11, 2025

(54) CANNABICHROMENE DERIVATIVES AND USE THEREOF

(71) Applicant: Remedy Processors LLC, San Diego, CA (US)

(72) Inventors: Wayne Wesley Harding, New York, NY (US); Hari Krishna Namballa, New York, NY (US)

(73) Assignee: Remedy Processors LLC, San Diego, CA (US)

( * ) Notice: Subject to any disclaimer, the term of this patent is extended or adjusted under 35 U.S.C. 154(b) by 0 days.

(21) Appl. No.: 19/069,464

(22) Filed: Mar. 4, 2025

(65) Prior Publication Data

US 2025/0243175 A1    Jul. 31, 2025

Related U.S. Application Data

(63) Continuation of application No. PCT/US2024/012116, filed on Jan. 19, 2024.

(60) Provisional application No. 63/541,044, filed on Sep. 28, 2023, provisional application No. 63/541,063, filed on Sep. 28, 2023, provisional application No. 63/541,061, filed on Sep. 28, 2023, provisional application No. 63/440,344, filed on Jan. 20, 2023.

(51) Int. Cl.
  *C07D 311/58* (2006.01)
  *A61K 31/00* (2006.01)
  *A61P 35/00* (2006.01)

(52) U.S. Cl.
  CPC .......... *C07D 311/58* (2013.01); *A61K 31/658* (2023.05); *A61P 35/00* (2018.01)

(58) Field of Classification Search
  CPC ...... C07D 311/58; A61P 35/00; A61K 31/658
  See application file for complete search history.

(56) References Cited

U.S. PATENT DOCUMENTS

2012/0277259 A1    11/2012   Gharat et al.

OTHER PUBLICATIONS

Tomko et al. "Anti-Cancer Potential of Cannabinoids, Terpenes, and Flavonoids Present in Cannabis." Cancers 12.7 (2020): 1985-. (Year: 2020).*
Hinz, Burkhard, and Robert Ramer. "Cannabinoids as Anticancer Drugs: Current Status of Preclinical Research." British journal of cancer 127.1 (2022): 1-13 (Year: 2022).*
Dariš et al "Cannabinoids in cancer treatment: Therapeutic potential and legislation" Bosn J Basic Med Sci. 2019;19(1):14-23. (Year: 2019).*
"2-Methyl-2-(4-methylpent-3-enyl)-5-nitroso-7-pentylchromene", Pubchem CID 1384 78343, Created Jul. 20, 2019; Retrieved on Apr. 2, 2024 from the Internet: [URL: https://pubchem.ncbi.nlm.nih.gov/compound/138478343], May 1, 2024, 1-8.

(Continued)

*Primary Examiner* — Renee Claytor
*Assistant Examiner* — Elena Vladimirovna Vishnyakova
(74) *Attorney, Agent, or Firm* — Elmore Patent Group, P.C.; Joseph C. Zucchero; Carolyn S. Elmore

(57) ABSTRACT

The present invention comprises a series of CBC derivative compounds and a method for their use. The compounds may be used to treat and/or diagnose cancer, Parkinson's Disease, Alzheimer's Disease, schizophrenia, depression, anxiety, substance abuse disorders, pain, and/or other diseases and disorders. The compounds may exist as a pharmaceutically acceptable salt or a stereoisomer thereof.

11 Claims, 11 Drawing Sheets

(56) References Cited

OTHER PUBLICATIONS

"2-Methyl-2-(4-methylpent-3-enyl)-7-pentylchromen-5-amine", Pubchem CID 156560741, , Created: Aug. 21, 2021; Retrieved on Apr. 2, 2024 from the Internet: [URL: https://pubchem.ncbi.nlm.nih.gov/compound/1565607 41 ], 1-8.

"5-Acetylamino-2,2-dimethylchromene:", Pubchem CID 14831890, Created: Feb. 9, 2007; Retrieved on Apr. 2, 2024 from the Internet: [URL: https://pubchem.ncbi.nlm.nih.gov/compound/14831890];, 1-8.

Anis, et al., "Cannabis-Derived Compounds Cannabichromene and Delta9-Tetrahydrocannabinol Interact and Exhibit-Cytotoxic Activity against Urothelial Cell Carcinoma Correlated with Inhibition of Cell Migration and Cytoskeleton Organization", Molecules 26(2), 465, hllps://www.ncbi.nlm.nih.gov/pmc/articles/PMC7830447/pdf/molecules-26-00465.pdf, Jan. 17, 2021, 1-14.

International Search Report and Written Opinion of the International Searching Authority, Application No. PCT/US24/12116, dated May 1, 2024.

\* cited by examiner

CANNABICHROMENE DERIVATIVES AND USE THEREOF

RELATED APPLICATIONS

This application is a continuation of International Application No. PCT/US24/12116, which designated the United States and was filed on Jan. 19, 2024, published in English, which claims the benefit of U.S. Provisional Application No. 63/440,344, filed on Jan. 20, 2023; U.S. Provisional Application No. 63/541,044, filed on Sep. 28, 2023; U.S. Provisional Application No. 63/541,061, filed on Sep. 28, 2023, and U.S. Provisional Application No. 63/541,063, filed on Sep. 28, 2023. The entire teachings of the above applications are incorporated herein by reference.

FIELD OF THE INVENTION

The present invention relates to cannabichromene derivatives and methods of treatment for various disorders and diseases.

BACKGROUND

*Cannabis sativa* (*Cannabis sativa*) has recently gained widespread attention with growing cultivation, use, and legalization worldwide. Some clinical studies have shown potential therapeutic and diagnostic effects from the plant and plant extracts.

Further, isolated compounds from the plant have shown similar effects. Such isolated compounds provide the possibility of direct therapeutic and diagnostic applications by allowing for controlled dosing and clear causation.

Delta-9-tetracannabinol (dronabinol, Marinol®) as well as the synthetic analog nabilone (Cesame®) are approved for use as anti-nausea medications for chemotherapy patients. Additional evidence has shown that various cannabinoids and synthetic analogs can be useful in treating inflammation, treating mental/behavioral conditions, treating gastrointestinal conditions, combating cancer, controlling and curing bacterial and viral infections, among others.

While much attention and research focus has been directed at cannabidiol (CBD) and delta-9-tetrahydrocannabinol (D9-THC), other cannabinoids present in the plant, and their synthetic analogs, have equal or even greater potential as treatment for various disorders and diseases. We expect that cannabichromene (CBC) may have significant medical applications. Until now, little research has been conducted on CBC and its uses.

Therefore, there exists a need in the field to study the medical benefits of cannabichromene analogs.

BRIEF SUMMARY OF THE INVENTION

One or more embodiments of the invention enable cannabichromene derivatives and use thereof.

Cannabichromene derivatives and use thereof is described. An illustrative embodiment of cannabichromene derivatives and use thereof includes a compound or a pharmaceutically acceptable salt or a stereoisomer thereof according to Formula I:

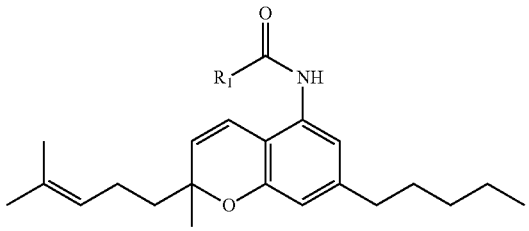

(I)

wherein: $R_1$ is selected from a group of aryl groups that may have additional functionalization including but not limited to amino (primary, secondary, or tertiary), hydroxy, halogens (bromo, chloro, fluoro), nitro, methoxy, carboxy, alkyl, aryl, and sulfonic acid. In some embodiments, a method is described for treating cancer, includes: administering a therapeutically effective amount of at least one compound according to formula I to a patient in need. In certain embodiments, a method is described for treating Parkinson's Disease, includes: administering a therapeutically effective amount of at least one compound according to formula I to a patient in need. In certain embodiments, a method is described for treating Alzheimer's Disease, including: administering a therapeutically effective amount of at least one compound according to formula I to a patient in need. In some embodiments, a method is described for treating schizophrenia, including: administering a therapeutically effective amount of at least one compound according to formula I to a patient in need. In some embodiments, a method is described for treating depression, including: administering a therapeutically effective amount of at least one compound according to formula I to a patient in need. In some embodiments, a method is described for treating anxiety, including: administering a therapeutically effective amount of at least one compound according to formula I to a patient in need. In some embodiments, a method is described for treating substance abuse disorders, including: administering a therapeutically effective amount of at least one compound according to formula I to a patient in need. In some embodiments, a method is described for treating pain, including: administering a therapeutically effective amount of at least one compound according to formula I to a patient in need.

An illustrative embodiment of cannabichromene derivatives and use thereof includes a compound or a pharmaceutically acceptable salt or a stereoisomer thereof according to Formula I:

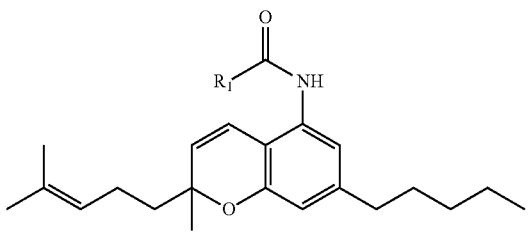

(I)

wherein: $R_1$ is alkyl, cycloalkyl, or aryl, wherein alkyl, cycloalkyl, or aryl groups may be substituted with hydroxy, alkoxy, halogen, nitro, carboxy, alkyl, aryl, and sulfonic acid.

In embodiments, $R_1$ is substituted or unsubstituted alkyl. Preferably the alkyl is substituted. Preferably the alkyl is unsubstituted. Preferably the alkyl is substituted or unsubstituted ethyl. Preferably, the alkyl is unsubstituted ethyl. Preferably, the alkyl is ethyl substituted with 1, 2, or 3 halogens. Preferably, the alkyl is substituted or unsubstituted methyl. Preferably, the alkyl is unsubstituted ethyl. Preferably, the alkyl is methyl substituted with 1, 2, or 3 halogens.

In embodiments, $R_1$ is substituted or unsubstituted cycloalkyl.

In embodiments, $R_1$ is substituted or unsubstituted aryl.

In some embodiments, a method is described for treating cancer, includes: administering a therapeutically effective amount of at least one compound according to formula I to a patient in need. In certain embodiments, a method is described for treating Parkinson's Disease, includes: administering a therapeutically effective amount of at least one compound according to formula I to a patient in need. In certain embodiments, a method is described for treating Alzheimer's Disease, including: administering a therapeutically effective amount of at least one compound according to formula I to a patient in need. In some embodiments, a method is described for treating schizophrenia, including: administering a therapeutically effective amount of at least one compound according to formula I to a patient in need. In some embodiments, a method is described for treating depression, including: administering a therapeutically effective amount of at least one compound according to formula I to a patient in need. In some embodiments, a method is described for treating anxiety, including: administering a therapeutically effective amount of at least one compound according to formula I to a patient in need. In some embodiments, a method is described for treating substance abuse disorders, including: administering a therapeutically effective amount of at least one compound according to formula I to a patient in need. In some embodiments, a method is described for treating pain, including: administering a therapeutically effective amount of at least one compound according to formula I to a patient in need.

An illustrative embodiment of cannabichromene derivatives and use thereof includes a compound or a pharmaceutically acceptable salt or a stereoisomer thereof according to Formula II

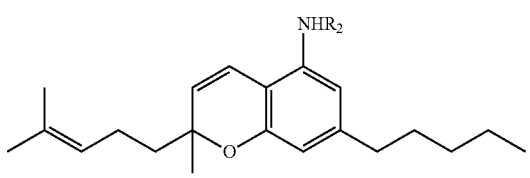

(II)

wherein: $R_2$ is selected from a group of aryl groups that may have additional functionalization including but not limited to amino (primary, secondary, or tertiary), hydroxy, halogens (bromo, chloro, fluoro), nitro, methoxy, carboxy, alkyl, aryl, and sulfonic acid. In some embodiments, a method is described for treating pain, including: administering a therapeutically effective amount of at least one compound according to formula II to a patient in need. In certain embodiments, a method is described for treating pain, including: administering a therapeutically effective amount of at least one compound according to formula II to a patient in need. In some embodiments, a method is described for treating pain, including: administering a therapeutically effective amount of at least one compound according to formula II to a patient in need. In certain embodiments, a method is described for treating pain, including: administering a therapeutically effective amount of at least one compound according to formula II to a patient in need. In some embodiments, a method is described for treating pain, including: administering a therapeutically effective amount of at least one compound according to formula II to a patient in need. In certain embodiments, a method is described for treating pain, including: administering a therapeutically effective amount of at least one compound according to formula II to a patient in need.

An illustrative embodiment of cannabichromene derivatives and use thereof includes a compound or a pharmaceutically acceptable salt or a stereoisomer thereof according to Formula II:

(II)

wherein: $R_2$ is hydrogen, alkyl, cycloalkyl, or aryl, wherein alkyl, cycloalkyl, or aryl groups may be substituted with hydroxy, alkoxy, halogen, nitro, carboxy, alkyl, aryl, and sulfonic acid.

In embodiments, $R_2$ is substituted or unsubstituted alkyl. Preferably the alkyl is substituted. Preferably the alkyl is unsubstituted. Preferably the alkyl is substituted or unsubstituted ethyl. Preferably, the alkyl is unsubstituted ethyl. Preferably, the alkyl is ethyl substituted with 1, 2, or 3 halogens. Preferably, the alkyl is substituted or unsubstituted methyl. Preferably, the alkyl is unsubstituted ethyl. Preferably, the alkyl is methyl substituted with 1, 2, or 3 halogens.

In some embodiments, a method is described for treating pain, including: administering a therapeutically effective amount of at least one compound according to formula II to a patient in need. In certain embodiments, a method is described for treating pain, including: administering a therapeutically effective amount of at least one compound according to formula II to a patient in need. In some embodiments, a method is described for treating pain, including: administering a therapeutically effective amount of at least one compound according to formula II to a patient in need. In certain embodiments, a method is described for treating pain, including: administering a therapeutically effective amount of at least one compound according to formula II to a patient in need. In some embodiments, a method is described for treating pain, including: administering a therapeutically effective amount of at least one compound according to formula II to a patient in need. In certain embodiments, a method is described for treating pain, including: administering a therapeutically effective amount of at least one compound according to formula II to a patient in need. In some embodiments, a method is described for treating pain, including: administering a therapeutically effective amount of at least one compound according to formula II to a patient in need. In certain embodiments, a method is described for treating pain, including: administering a therapeutically effective amount of at least one compound according to formula II to a patient in need.

An illustrative embodiment of cannabichromene derivatives and use thereof includes a compound or a pharmaceutically acceptable salt or a stereoisomer thereof according to Formula III (III)

wherein: $R_3$ is selected from a group of aryl groups that may have additional functionalization including but not limited to amino (primary, secondary, or tertiary), hydroxy, halogens (bromo, chloro, fluoro), nitro, methoxy, carboxy, alkyl, aryl, and sulfonic acid. In some embodiments, a method is described for treating pain, including: administering a therapeutically effective amount of at least one compound according to formula III to a patient in need. In certain embodiments, a method is described for treating pain, including: administering a therapeutically effective amount of at least one compound according to formula III to a patient in need. In some embodiments, a method is described for treating pain, including: administering a therapeutically effective amount of at least one compound according to formula III to a patient in need. In certain embodiments, a method is described for treating pain, including: administering a therapeutically effective amount of at least one compound according to formula III to a patient in need. In some embodiments, a method is described for treating pain, including: administering a therapeutically effective amount of at least one compound according to formula III to a patient in need. In certain embodiments, a method is described for treating pain, including: administering a therapeutically effective amount of at least one compound according to formula III to a patient in need. In some embodiments, a method is described for treating pain, including: administering a therapeutically effective amount of at least one compound according to formula III to a patient in need. In certain embodiments, a method is described for treating pain, including: administering a therapeutically effective amount of at least one compound according to formula III to a patient in need.

An illustrative embodiment of cannabichromene derivatives and use thereof includes a compound or a pharmaceutically acceptable salt or a stereoisomer thereof according to Formula III:

(III)

wherein: $R_3$ is alkyl, cycloalkyl, or aryl, wherein alkyl, cycloalkyl, or aryl groups may be substituted with hydroxy, alkoxy, halogen, nitro, carboxy, alkyl, aryl, and sulfonic acid.

In embodiments, $R_3$ is substituted or unsubstituted alkyl. Preferably the alkyl is substituted or unsubstituted ethyl. Preferably, the alkyl is unsubstituted ethyl. Preferably, the alkyl is ethyl substituted with 1, 2, or 3 halogens. Preferably, the alkyl is substituted or unsubstituted methyl. Preferably, the alkyl is unsubstituted ethyl. Preferably, the alkyl is methyl substituted with 1, 2, or 3 halogens.

In some embodiments, a method is described for treating pain, including: administering a therapeutically effective amount of at least one compound according to formula III to a patient in need. In certain embodiments, a method is described for treating pain, including: administering a therapeutically effective amount of at least one compound according to formula III to a patient in need. In some embodiments, a method is described for treating pain, including: administering a therapeutically effective amount of at least one compound according to formula III to a patient in need. In certain embodiments, a method is described for treating pain, including: administering a therapeutically effective amount of at least one compound according to formula III to a patient in need. In some embodiments, a method is described for treating pain, including: administering a therapeutically effective amount of at least one compound according to formula III to a patient in need. In certain embodiments, a method is described for treating pain, including: administering a therapeutically effective amount of at least one compound according to formula III to a patient in need. In some embodiments, a method is described for treating pain, including: administering a therapeutically effective amount of at least one compound according to formula III to a patient in need. In certain embodiments, a method is described for treating pain, including: administering a therapeutically effective amount of at least one compound according to formula III to a patient in need.

An illustrative embodiment of cannabichromene derivatives and use thereof includes a compound or a pharmaceutically acceptable salt or a stereoisomer thereof according to Formula IV:

IV

In some embodiments, a method is described for treating pain, including: administering a therapeutically effective amount of at least one compound according to formula IV to patient in need. In certain embodiments, a method is described for treating pain, including: administering a therapeutically effective amount of at least one compound according to formula IV to a patient in need. In some embodiments, a method is described for treating pain, including: administering a therapeutically effective amount of at least one compound according to formula IV to a patient in need. In certain embodiments, a method is described for treating pain, including: administering a therapeutically effective amount of at least one compound according to formula IV to a patient in need. In some embodiments, a method is described for treating pain, including: administering a therapeutically effective amount of at least one compound according to formula IV to a patient in need. In certain embodiments, a method is described for treating pain, including: administering a therapeutically effective amount of at least one compound according to formula IV to a patient in need. In some embodiments, a method is described for treating pain, including: administering a therapeutically effective amount of at least one compound according to formula IV to a patient in need. In certain embodiments, a method is described for treating pain, including: administering a therapeutically effective amount of at least one compound according to formula IV to a patient in need.

An illustrative embodiment of cannabichromene derivatives and use thereof includes a compound or a pharmaceutically acceptable salt or a stereoisomer thereof according to Formula V:

V

In some embodiments, a method is described for treating pain, including: administering a therapeutically effective amount of at least one compound according to formula V to a patient in need. In certain embodiments, a method is described for treating pain, including: administering a therapeutically effective amount of at least one compound according to formula V to a patient in need. In some embodiments, a method is described for treating pain, including: administering a therapeutically effective amount of at least one compound according to formula V to a patient in need. In certain embodiments, a method is described for treating pain, including: administering a therapeutically effective amount of at least one compound according to formula V to a patient in need. In some embodiments, a method is described for treating pain, including: administering a therapeutically effective amount of at least one compound according to formula V to a patient in need. In certain embodiments, a method is described for treating pain, including: administering a therapeutically effective amount of at least one compound according to formula V to a patient in need. In some embodiments, a method is described for treating pain, including: administering a therapeutically effective amount of at least one compound according to formula V to a patient in need. In certain embodiments, a method is described for treating pain, including: administering a therapeutically effective amount of at least one compound according to formula V to a patient in need.

BRIEF DESCRIPTION OF THE DRAWINGS

Some embodiments of the present invention are illustrated as an example and are not limited by the figures of the accompanying drawings, in which like references may indicate similar elements and in which.

DEFINITIONS

Figure 1:
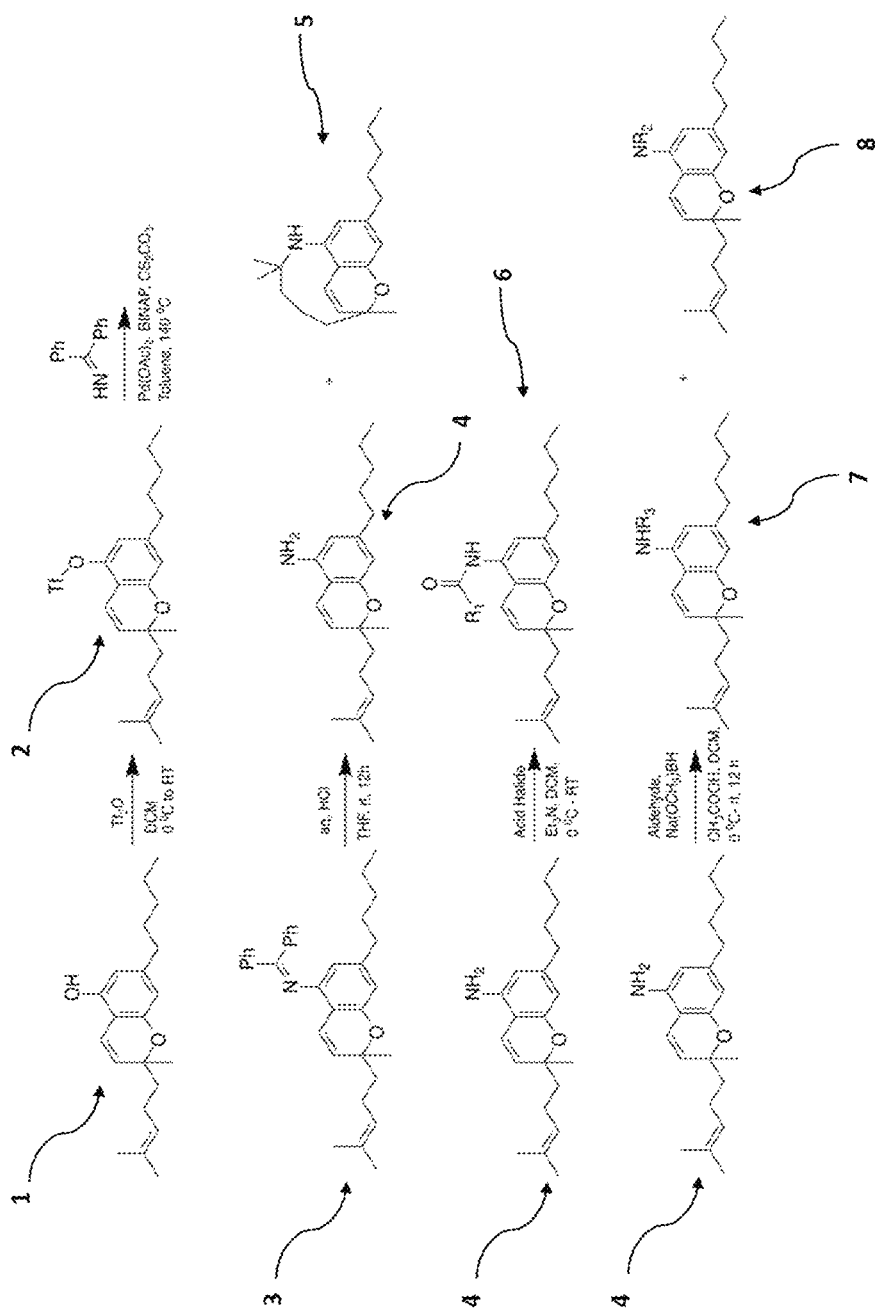
FIG. 1 shows one example of a synthetic route for preparation of cannabichromene analogs according to the present disclosure.

CBC: cannabichromene
CBN: cannabinol
CBDV: cannabidivarin
Amine: compounds and functional groups that contain a basic nitrogen atom with a lone pair of electrons with 0 to 3 hydrogen atoms.
Amino group: a substituent functional group consisting of an amine.
Alkyl group: a substituent functional group consisting of a chain of carbon atoms saturated or unsaturated with hydrogens.
$Tf_2O$: Trifluoromethanesulfonic anhydride
Py: Pyridine
DCM: dichloromethane or methylene chloride
RT: room temperature
Ph: phenol
$Pd(OAc)_2$: palladium (II) acetate
BINAP: 2,2'-bis(diphenylphosphino)-1,1'-binaphthyl
$Cs_2CO_3$: cesium carbonate
HCl: hydrochloric acid
Aq.: aqueous
THF: tetrahydrofuran
Acid Halide: acid containing a halide
$Et_3N$: triethylamine
$CH_3COOH$: acetic acid or ethanoic acid
Aldehyde: a compound containing a functional group with the structure R—CH=O.
$Na(OCH_3)_3BH$: Sodium trimethoxyborohydride
° C.: degree Celsius
CNS: central nervous system

DETAILED DESCRIPTION OF THE INVENTION

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

As used herein, the term "alkyl" describes both substituted or unsubstituted straight and branched carbon chains. Preferred alkyl groups are those containing from one to fifteen carbon atoms (i.e., $C_1$-$C_{15}$ alkyl), more preferably $C_1$-$C_{10}$ alkyl, more preferably $C_1$-$C_5$ alkyl. In embodiments, the alkyl is selected from methyl, ethyl, propyl, 1-methylethyl, butyl, 1-methylpropyl, 2-methylpropyl, pentyl, 1-methylbutyl, 2-methylbutyl, 3-methylbutyl, 1,1-dimethylpropyl, 1,2-dimethylpropyl, 2,2-dimethylpropyl, each of which can be optionally substituted. Preferably, the alkyl is substituted or unsubstituted ethyl. Preferably, the alkyl is unsubstituted ethyl.

Preferably, the alkyl is ethyl substituted with 1, 2, or 3 halogens.

Preferably, the alkyl is substituted or unsubstituted methyl. Preferably, the alkyl is unsubstituted ethyl. Preferably, the alkyl is methyl substituted with 1, 2, or 3 halogens.

As used herein, the term "aryl" or "aromatic group" are used interchangeably to describe either substituted or unsubstituted single-ring or polycyclic ring system. Polycyclic rings may have two or more rings in which two carbons are common to two adjoining rings ("fused" rings) wherein at least one of the rings is aromatic, e.g., the other rings can be cycloalkyls, cycloalkenyls, aryl, heterocycles, and/or heteroaryls. Preferred aryl groups are those containing six to thirty carbon atoms (i.e., $C_6$-$C_{30}$ aryl), preferably six to twenty carbon atoms (i.e., $C_6$-$C_{20}$ aryl), more preferably six to twelve carbon atoms (i.e., $C_6$-$C_{12}$ aryl). In embodiments, the aryl comprises six carbon atoms, ten carbons, or twelve carbons. Suitable aryl groups include, but are not limited to, phenyl, biphenyl, triphenyl, triphenylene, tetraphenylene, naphthalene, anthracene, phenalene, phenanthrene, fluorene, pyrene, chrysene, perylene, and azulene, preferably phenyl, biphenyl, triphenyl, triphenylene, fluorene, and naphthalene, each of which can be optionally substituted.

As used herein, the term "cycloalkyl" by itself, or as part of another substituent, unless otherwise stated, refers to saturated or partially unsaturated, nonaromatic monocyclic ring, bridged rings, spiro rings, fused rings (e.g., bicyclic or tricyclic carbon ring systems), or cubane, having the number of carbon atoms indicated in the prefix or if unspecified having 3-6, also 4-6, and also 5-6 ring members per ring, such as cyclopropyl, cyclopentyl, cyclohexyl, where one or two ring carbon atoms may optionally be replaced by a carbonyl. Further, the term cycloalkyl is intended to encompass ring systems fused to an aromatic ring (e.g., of an aryl or heteroaryl), regardless of the point of attachment to the remainder of the molecule. Cycloalkyl refers to hydrocarbon rings having the indicated number of ring atoms (e.g., $C_{3-6}$ cycloalkyl and 3-6 membered cycloalkyl both mean three to six ring carbon atoms).

"Halogen" or "halo" refers to all halogens, that is, chloro (Cl), fluoro (F), bromo (Br), or iodo (I).

The term "haloalkyl" refers to an alkyl substituted by one to seven halogen atoms. Haloalkyl includes monohaloalkyl or polyhaloalkyl. For example, the term "$C_1$-$C_6$haloalkyl" is meant to include trifluoromethyl, difluorobromomethyl, difluoromethyl, dichloromethyl, 2,2,2-trifluoroethyl, 4-chlorobutyl, 3-bromopropyl, and the like.

"Alkoxy" or "alkoxyl" refers to a —O-alkyl group, where alkyl is as defined herein. By way of example, "$C_1$-$C_6$alkoxy" refers to a —O—$C_1$-$C_6$alkyl group, where alkyl is as defined herein. While it is understood that substitutions on alkoxy are attached at any available atom to produce a stable compound, substitution of alkoxy is such that O, S, or N (except where N is a heteroaryl ring atom), are not bound to the alkyl carbon bound to the alkoxy O. Further, where alkoxy is described as a substituent of another moiety, the alkoxy oxygen is not bound to a carbon atom that is bound to an O, S, or N of the other moiety (except where N is a heteroaryl ring atom), or to an alkene or alkyne carbon of the other moiety.

As used herein, the term "aralkyl" describes an alkyl group that has as a substituent an aromatic group. Additionally, the aralkyl group may be optionally substituted.

As used herein, the term "alkoxy" describes any alkyl group singly bonded to an oxygen group. In embodiments, the alkoxy group includes but is not limited to an ether, ester, amide, carboxylic acid, polyethyelene glycol (featuring periodic insertions of an oxygen atom into a carbon chain and terminated with an alcohol or an alkyl group), or alcohol.

As used herein, the term "solubilizing group" describes a terminal carboxylic acid, sulfonate, benzyl sulfonic acid, alcohol group introduced to improve solubility in polar solvents (water, alcohol).

Novel methods for the isolation of cannabinoids are discussed herein.

CBDV can be used as an initial reactant and may comprise 50% to 99% CBDV but may comprise 90-99% CBDV in embodiments. Such CBDV purity may be achieved through separation techniques or combination of separation techniques described herein and well known to those with skill in the art.

In the following description, for purposes of explanation, numerous specific details are set forth in order to provide a thorough understanding of the present invention. It will be evident, however, to one skilled in the art, that the present invention may be practiced without these specific details.

The present disclosure is to be considered as an exemplification of the invention, and is not intended to limit the invention to the specific embodiments illustrated by the figures or description below.

The present invention will now be described by referencing the appended figures representing preferred embodiments. FIG. 1 depicts a conventional one method for the synthesis of the CBC derivatives (the "method") as described herein. However, alternative synthetic routes may be used in other embodiments to produce the same compounds, which may be equally applied to treat the disorders and infections described herein.

In a preferred embodiment, the compounds described herein may be synthesized from CBC (cannabichromene). This CBC may be derived naturally from the hemp plant or may itself be synthesized. In some embodiments, the naturally derived CBC may begin as a combination of various cannabinoids, including CBC, present in the hemp plant. First, these cannabinoids may be extracted from the plant using one or more solvents in certain embodiments. In preferred embodiments, the solvents used may include alcohols (like methanol or ethanol), hydrocarbons (like heptane or butane), $CO_2$, and/or other solvents.

In a preferred embodiment, following the extraction of the cannabinoids, the solvent or solvents may be removed to form a crude concentrate via evaporation or similar method well known to those with ordinary skill in the art. Solvent removal should result in a crude mixture of cannabinoids.

In a preferred embodiment, the crude cannabinoid mixture may be distilled to further purify and/or concentrate the mixture, resulting in a distilled concentrate. The distillation may be performed using a short path distillation apparatus, fractional distillation, a wiped film distillation apparatus, a falling film distillation and/or any other distillation apparatus. In preferred embodiments, the distillation can be performed under reduced pressure and elevated temperatures. In preferred embodiments, the distillation may be performed at temperatures ranging from 100° C. to 250° C. In some embodiments, the distillation may be used to remove unwanted volatile compounds such as terpenes, terpenoids, and/or other plant material.

In a preferred embodiment, the cannabichromene may then be separated and/or isolated via chromatography, additional distillation, or similar separation technique. In an alternative embodiment, the crude mixture can be used without distillation. In this case, the CBC would be separated from the crude mixture using chromatography, distillation, and/or similar process to separate the CBC, which then may or may not be followed by an additional distillation. In a preferred embodiment, the distilled concentrate may first be dissolved in a solvent such as ethanol, methanol, acetonitrile, acetone, hydrocarbon solvents, and/or any other polar or non-polar solvent for loading on to the column. In some embodiments, the distilled concentrate may be loaded on to the column without the use of a solvent. In a preferred embodiment, the volume of solvent used should range from 1 ml solvent to Ig distilled concentrate to 10 ml of solvent to Ig of distilled concentrate.

In an alternative embodiment, the CBC may be synthesized instead of being extracted from the hemp plant. In this case, the CBC may be synthesized from smaller building block compounds or from other cannabinoids. As an example, CBC may be synthesized from CBG using a cyclization or similar reaction. In a preferred embodiment, following the CBC synthesis reaction, chromatography, distillation, and/or similar separation techniques well known to those with ordinary skill in the art may be used to purify, concentrate, and/or isolate CBC for subsequent reactions, as described herein.

In a preferred embodiment, the isolated and/or concentrated CBC, either naturally derived or synthesized, may be used to create CBC derivatives, as described herein. Referring now to FIG. 1, the CBC (1) is used as an initial reactant and may comprise 50% to 99% CBC but may comprise 90-99% CBC in a preferred embodiment. Such CBC purity may be achieved through separation techniques or combination of separation techniques described herein and well known to those with skill in the art.

In a preferred embodiment, the CBC starting material (1) may be treated with $Tf_2O$ and pyridine using DCM as a solvent, as shown in FIG. 1. In a preferred embodiment, the reagents, including CBC (1), $Tf_2O$, and pyridine may be dissolved and/or mixed with DCM and reacted at any temperature from −10° C. to room temperature. In a preferred embodiment, the reaction may last from 30 minutes to 24 hours. In some embodiments, the reaction may be performed under inert atmosphere using nitrogen, argon, and/or similar inert gases. In other embodiments, the reaction may be performed in the presence of air. In a preferred embodiment, the reaction may result in the Tf-substituted CBC (2), in which the hydroxyl proton is substituted for a Tf atom.

In a preferred embodiment, the Tf-substituted CBC (2) may be isolated for subsequent reactions from unreacted CBC (1), reaction byproducts, and/or unreacted reagents $Tf_2O$ and pyridine, as shown in FIG. 1. In a preferred embodiment, a liquid-liquid extraction with water, aqueous base solution, and/or another polar solvent may remove $Tf_2O$ and pyridine. In an alternative embodiment, the $Tf_2O$ and pyridine may be removed via distillation. The distillation may be performed under reduced pressure and/or elevated temperature. In some embodiments, the distillation used may be fractional distillation. In some embodiments, toluene may be added to the crude reaction mixture to facilitate the distillation of $Tf_2O$. In this case, the $Tf_2O$ may form an azeotrope with toluene. In a preferred embodiment, the Tf-substituted CBC (2) may be separated from the unreacted CBC (1) and/or reaction byproducts using chromatography, distillation, precipitation, and/or similar separation technique known to those in the art. Similarly, the DCM may be removed and/or isolated from the reaction mixture using solvent removal techniques well known in the art. As an example, the DCM may be removed using heat and vacuum such as in a rotary evaporator.

Referring still to FIG. 1, the Tf-substituted CBC (2) then undergoes a subsequent reaction to form a benzophenone-imine-substituted CBC (3). In a preferred embodiment, the reaction from Tf-substituted CBC (2) to a benzophenone-imine-substituted CBC (3) may be performed by treating Tf-substituted CBC (2) with palladium acetate ($Pd(OAc)_2$), benzophenone imine, cesium carbonate, and BINAP, as shown in FIG. 1. In a preferred embodiment, the Tf-substituted CBC (2) and the other reagents may be dissolved in toluene and allowed to stir for the reaction to occur. In a preferred embodiment, the reaction mixture might be heated to a temperature of between 50° C. to 200° C. during the course of the reaction. In a preferred embodiment, the reaction may last from 30 minutes to 24 hours. In some embodiments, the reaction may be performed under inert atmosphere using nitrogen, argon, and/or similar inert gases. In other embodiments, the reaction may be performed in the presence of air. In a preferred embodiment, the reaction may result in the benzophenone-imine-substituted CBC (3), in which the oxygen and Tf atoms are substituted for benzophenone imine.

In a preferred embodiment, the benzophenone-imine-substituted CBC (3) may be isolated for subsequent reactions from unreacted Tf-substituted CBC (2), reaction byproducts, toluene, and/or unreacted reagents $Pd(OAc)_2$, benzophenone imine, cesium carbonate, and BINAP, as shown in FIG. 1. In some embodiments, the $Pd(OAc)_2$ from the reaction mixture may be removed and/or isolated from the reaction mixture via filtration. In some embodiments, the filtration filter may comprise a bed made of celite or similar media while in other embodiments the filtration may go through a fritted disk and/or filter paper, as is well understood in the art. In an alternative embodiment, the $Pd(OAc)_2$ may be removed via distillation as described herein.

In a preferred embodiment, the cesium carbonate may be removed from the reaction mixture using a liquid-liquid extraction. As an example, the reaction mixture may be dissolved in a non-polar solvent such as heptane, pentane, ether, or similar non-polar solvent. The mixture dissolved in the non-polar solvent that may be mixed with a polar solvent such as water, aqueous base, alcohol, or similar polar solvent that is immiscible solvent. In a preferred embodiment, the cesium carbonate may dissolve in the polar solvent leaving the remaining reaction mixture, including the benzophenone-imine-substituted CBC (3), dissolved in the non-polar solvent. In this example, the non-polar solvent can continue to other separation processes and/or undergo solvent removal via evaporation and/or similar solvent removal technique as described herein.

In a preferred embodiment, the BINAP, reaction by-products, and/or benzophenone imine may be removed and/or isolated from the reaction mixture using chromatography, distillation and/or similar separation technique, as described herein. Similarly, the toluene may be removed and/or isolated from the reaction mixture using solvent removal techniques well known in the art. As an example, the toluene may be removed using heat and vacuum such as in a rotary evaporator.

Referring still to FIG. 1, the benzophenone-imine-substituted CBC (3) then undergoes a subsequent reaction to form a primary-amino-substituted CBC (4) and an amino-carbon-bridge-substituted (5) in a preferred embodiment. In a preferred embodiment, the reaction will result in a combination of 10-90% an amino-substituted CBC (4) with the remaining mixture comprising amino-carbon-bridge-substituted (5).

In a preferred embodiment, the reaction from benzophenone-imine-substituted CBC (3) to a combination of a primary-amino-substituted CBC (4) and an amino-carbon-bridge-substituted (5) may be performed by treating benzophenone-imine-substituted CBC (3) with aqueous hydrochloric acid. In a preferred embodiment, the reagents, including benzophenone-imine-substituted CBC (3) and HCl may be dissolved and/or mixed with THF and reacted at any temperature from −10° C. to room temperature. In a preferred embodiment, the reaction may last from 30 minutes to 24 hours. In some embodiments, the reaction may be performed under inert atmosphere using nitrogen, argon, and/or similar inert gases. In other embodiments, the reaction may be performed in the presence of air. In a preferred embodiment, the reaction may result in a combination of a primary-amino-substituted CBC (4) and an amino-carbon-bridge-substituted (5), as shown in FIG. 1.

In a preferred embodiment, the primary-amino-substituted CBC (4) and the amino-carbon-bridge-substituted (5) should be separated and/or isolated from each other, unreacted benzophenone-imine-substituted CBC (3), reaction byproducts, THF, and/or unreacted HCl. In a preferred embodiment, a liquid-liquid extraction with water, aqueous base solution, and/or another polar solvent may remove HCl. In a preferred embodiment, the HCl may be treated with base to neutralize the solution before extracting in the liquid-liquid-extraction. In other embodiments, the HCl may be removed via distillation. In preferred embodiments, the THF may be removed via evaporation, distillation, and/or other solvent removal processes described herein and known well in the art. For example, the THF may be removed using a rotary evaporator.

In a preferred embodiment, the primary-amino-substituted CBC (4) and the amino-carbon-bridge-substituted (5) should be separated and/or isolated from each other to use both compounds (4) and (5) in isolation as a pharmaceutical/medicinal use described herein and to use the primary-amino-substituted CBC (4) for further reaction, as shown in FIG. 1. In a preferred embodiment, the primary-amino-substituted CBC (4) and the amino-carbon-bridge-substituted (5) may be separated and/or isolated from each other using chromatographic and/or distillation methods described herein.

In a preferred embodiment, the primary-amino-substituted CBC (4) may be used as a reagent and/or starting material to make several other CBC derivatives used for the pharmaceutical and/or medicinal applications described herein. As shown in FIG. 1, the primary-amino-substituted CBC (4) may be reacted to make the acetamide-substituted CBC (6).

In a preferred embodiment, the reaction from the primary-amino-substituted CBC (4) to one of the acetamide-substituted CBC (6) may be performed by treating the primary-amino-substituted CBC (4) with an acid halide and $Et_3N$. In a preferred embodiment, the reagents may be dissolved in DCM and allowed to react while stirring at a temperature between −10° C. and room temperature to form one of the acetamide-substituted CBC (6) shown in FIG. 1 where $R_1$ is selected from a group of CH3, phenol, CH2OCH3, CHCl2, CH2CF3, and CF2Br. In a preferred embodiment, the reaction may last from 30 minutes to 24 hours. In some embodiments, the reaction may be performed under inert atmosphere using nitrogen, argon, and/or similar inert gases. In other embodiments, the reaction may be performed in the presence of air. In a preferred embodiment, the reaction may form one of the acetamide-substituted CBC (6) shown in FIG. 1.

In a preferred embodiment, the acid halide used for the reaction to form acetamide-substituted CBC (6) as described herein may be selected based on the desired functional group $R_1$. As such, the structure of the acid halide may resemble one resembling $R_1$—C—O—Cl where "C" is carbon, "O" is oxygen, "Cl" is chloride, and $R_1$ is the desired functional group. As an example, if the desired functional group is $CH_3$ in the place of $R_1$ then the acid halide used would be acetyl chloride with the following structure:

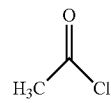

In this example, the resulting structure may be one in which the $R_1$ is a methane group ($CH_3$) with the following structure:

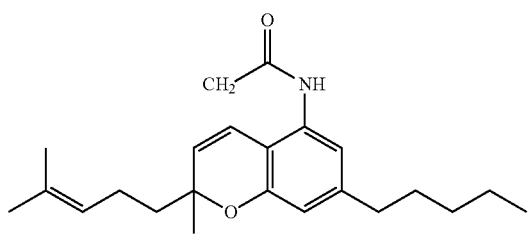 [SMILES: CCCCCc1cc(NC(C)=O)c2c(c1)OC(C)(CCC=C(C)C)C=C2]

In the above example, the $R_1$ is methane ($CH_3$) but may be different functional groups in other embodiments. As stated herein, $R_1$ may be selected from a group of CH3, phenol, CH2OCH3, CHCl2, CH2CF3, and CF2Br in the acetamide-substituted CBC (6) shown in FIG. 1.

In a preferred embodiment, the acetamide-substituted CBC (6) should be separated and/or isolated from unreacted starting material, reaction byproducts, the acid halide used, the $Et_3N$, and the DCM to be used in isolation as a pharmaceutical/medicinal use described herein. The acid halide may be removed by distillation, chromatography and/or other separation techniques known in the art, as described herein. Similarly, $Et_3N$ may be removed with a liquid-liquid extraction using aqueous HCl to form a chloride salt that dissolves in water and/or other polar solvents, as described herein. Additionally, the DCM solvent may be removed like in the other reactions described herein, for example by evaporation in a rotary evaporator.

In a preferred embodiment, the primary-amino-substituted CBC (4) may be used as a reagent and/or starting material to make several other additional CBC derivatives used for the pharmaceutical and/or medicinal applications described herein. As shown in FIG. 1, the primary-amino-substituted CBC (4) may be reacted to make a combination of a secondary-amino-substituted CBC (7) and a tertiary-amino-substituted CBC (8), as shown in FIG. 1.

In a preferred embodiment, the primary-amino-substituted CBC (4) may be converted into a secondary-amino-substituted CBC (7) and a tertiary-amino-substituted CBC (8) by treating the primary-amino-substituted CBC (4) with an aldehyde, $CH_3COOH$, and $Na(OCH_3)_3BH$, as shown in FIG. 1. In a preferred embodiment, the reagents may be dissolved in DCM and allowed to react while stirring at a temperature between −10° C. and room temperature to form as shown in FIG. 1 where $R_2$ and $R_3$ are both selected from a group of alkyl chains that may have additional functionalization including but not limited to amino (primary, secondary, or tertiary), hydroxy, halogens (bromo, chloro, fluoro), nitro, methoxy, carboxy, alkyl, aryl, and sulfonic acid, preferably those with 2-12 carbons. In a preferred embodiment, the reaction may last from 30 minutes to 24 hours. In some embodiments, the reaction may be performed under inert atmosphere using nitrogen, argon, and/or similar inert gases. In other embodiments, the reaction may be performed in the presence of air. In a preferred embodiment, the reaction may form one of the acetamide-substituted CBC (6) shown in FIG. 1.

As shown in FIG. 1, the secondary-amino-substituted CBC (7) and the tertiary-amino-substituted CBC (8) contain functional groups $R_2$ and $R_3$, respectively, with both $R_2$ and $R_3$ comprising an alkyl chain that may have additional functionalization including but not limited to amino (primary, secondary, or tertiary), hydroxy, halogens (bromo, chloro, fluoro), nitro, methoxy, carboxy, alkyl, aryl, and sulfonic acid. of any length but preferably containing 2-12 carbon atoms, as described herein. In a preferred embodiment, the aldehyde used for the reaction to form the secondary-amino-substituted CBC (7) and the tertiary-amino-substituted CBC (8) as described herein may be selected based on the desired functional groups $R_2$ and $R_3$. As such, the structure of the aldehyde may resemble the following structure where "R" is the functional group desired to take the place of $R_2$ and $R_3$ in the secondary-amino-substituted CBC (7) and the tertiary-amino-substituted CBC (8), respectively.

As an example, if the desired functional group is a two-carbon alkyl chain having a structure of $CH_2CH_3$ then the aldehyde used may be propanal (propionaldehyde) with the following structure:

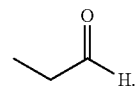

In this example, the resulting secondary-amino-substituted CBC (7) may have a $CH_2CH_3$ functional group in place of the $R_2$ resembling the following structure:

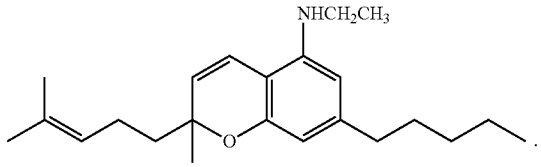

In the above example, the resulting tertiary-amino-substituted CBC (8) may have two $CH_2CH_3$ functional group in place of the $R_3$ resembling the following structure:

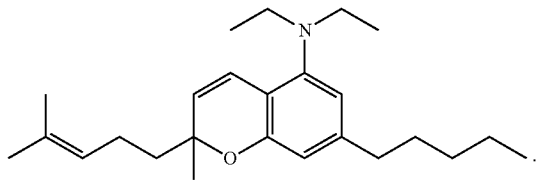 [SMILES: CCCCCc1cc2c(c(N(CC)CC)c1)C=CC(C)(CCC=C(C)C)O2]

In a preferred embodiment, $R_2$ and $R_3$ are comprised of the same functional group with $R_3$ having two such functional groups, as is shown in the above example.

In a preferred embodiment, the secondary-amino-substituted CBC (7) and the tertiary-amino-substituted CBC (8) should be separated and/or isolated from unreacted starting material, reaction byproducts, the aldehyde, the $CH_3COOH$, the $Na(OCH_3)_3BH$ the DCM, and from one another to be used in isolation as a pharmaceutical/medicinal use described herein. The aldehyde and $Na(OCH_3)_3BH$ may be removed by distillation, chromatography and/or other separation techniques known in the art, as described herein. Similarly, the secondary-amino-substituted CBC (7) and the tertiary-amino-substituted CBC (8) may be separated from one another using chromatography and/or distillation. Similarly, the $CH_3COOH$ may be removed with a liquid-liquid extraction using water, aqueous base, and/or other polar solvents. Additionally, the DCM solvent may be removed like in the other reactions described herein, for example by evaporation in a rotary evaporator.

Non-limiting examples of compounds according to the invention are shown in Table 1.

TABLE 1

| Cmp # | Structure |
|---|---|
| 1 | 5-(benzamido)-2-methyl-2-(4-methylpent-3-enyl)-7-pentyl-2H-chromene |
| 2 | 5-(2-methoxyacetamido)-2-methyl-2-(4-methylpent-3-enyl)-7-pentyl-2H-chromene |
| 3 | 5-amino-2-methyl-2-(4-methylpent-3-enyl)-7-pentyl-2H-chromene |
| 4 | macrocyclic chromene amine |
| 5 | 5-acetamido-2-methyl-2-(4-methylpent-3-enyl)-7-pentyl-2H-chromene |
| 6 | 5-(ethylamino)-2-methyl-2-(4-methylpent-3-enyl)-7-pentyl-2H-chromene |
| 7 | 5-(diethylamino)-2-methyl-2-(4-methylpent-3-enyl)-7-pentyl-2H-chromene |
| 8 | 5-(2,2-dichloroacetamido)-2-methyl-2-(4-methylpent-3-enyl)-7-pentyl-2H-chromene |
| 9 | 5-(3,3,3-trifluoropropanamido)-2-methyl-2-(4-methylpent-3-enyl)-7-pentyl-2H-chromene |
| 10 | 5-(2-bromo-2,2-difluoroacetamido)-2-methyl-2-(4-methylpent-3-enyl)-7-pentyl-2H-chromene |
| 11 | 5-(cyclopentanecarboxamido)-2-methyl-2-(4-methylpent-3-enyl)-7-pentyl-2H-chromene |
| 12 | 5-(pentanamido)-2-methyl-2-(4-methylpent-3-enyl)-7-pentyl-2H-chromene |
| 13 | 5-(propylamino)-2-methyl-2-(4-methylpent-3-enyl)-7-pentyl-2H-chromene |
| 14 | 5-(propylamino)-2-methyl-2-(4-methylpent-3-enyl)-7-pentyl-2H-chromene |

TABLE 1-continued

| Cmp # | Structure |
|---|---|
| 15 | 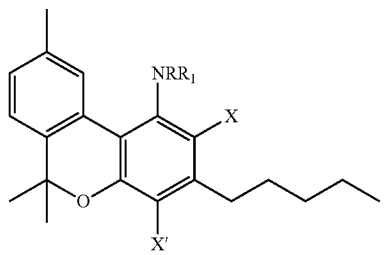 |

In preferred embodiment, any of the reactions discussed herein may be monitored by analytical techniques known in the art including, but not limited to, high performance liquid chromatography and/or gas chromatography paired with UV/visible spectroscopy, mass spectroscopy, IR spectroscopy, nuclear magnetic resonance, and/or other analytical techniques.

In preferred embodiment, the CBC derivatives including Tf-substituted CBC (2), benzophenone-imine-substituted CBC (3), primary-amino-substituted CBC (4), amino-carbon-bridge-substituted (5), acetamide-substituted CBC (6), secondary-amino-substituted CBC (7) and the tertiary-amino-substituted CBC (8) may be used to treat a variety of mental and physical disorders such as cancer, Parkinson's disease, Alzheimer's disease, schizophrenia, depression, anxiety, substance abuse disorders, pain, and/or other disorders. The compounds (2)-(8) may be used in isolation or in conjunction with other compounds (2)-(8) and/or other compounds not explicitly included herein.

In preferred embodiment, the CBC derivatives shown in Table 1 may be used to treat a variety of mental and physical disorders such as cancer, Parkinson's disease, Alzheimer's disease, schizophrenia, depression, anxiety, substance abuse disorders, pain, and/or other disorders. The compounds in Table 1 may be used in isolation or in conjunction with other compounds in Table 1 and/or other compounds not explicitly included herein.

One or more embodiments of the invention enable cannabinol derivatives and use thereof.

Cannabinol derivatives and use thereof is described. An illustrative embodiment of cannabinol derivatives and use thereof includes a compound or a pharmaceutically acceptable salt or a stereoisomer thereof according to Formula VI wherein: R and $R_1$ are independently selected from hydrogen, $-CO_2CH_2R_2-$, $SO_2CH_2R_2-$, $CONHR_2$, aryl, and alkyl, wherein the aryl or alkyl groups may have additional functionalization including but not limited to amino (primary, secondary, or tertiary), hydroxy, halogens (bromo, chloro, fluoro), nitro, methoxy, carboxy, alkyl, aryl, and sulfonic acid; $R_2$ is selected from alkyl, hydroalkyl, aminoalkyl, carboxyalkyl, alkoxy, vinyl, aryl, and acyl, and X and X' are independently selected from hydrogen, halogen, aryl, alkyl, and alkenyl.

In some embodiments, a method is described for treating cancer, the method comprising administering a therapeutically effective amount of at least one compound according to formula VI to a patient in need. In certain embodiments, a method is described for treating Parkinson's Disease, the method comprising: administering a therapeutically effective amount of at least one compound according to formula VI to a patient in need. In certain embodiments, a method is described for treating Alzheimer's Disease, the method comprising: administering a therapeutically effective amount of at least one compound according to formula VI to a patient in need. In some embodiments, a method is described for treating schizophrenia, the method comprising: administering a therapeutically effective amount of at least one compound according to formula VI to a patient in need. In some embodiments, a method is described for treating depression, the method comprising: administering a therapeutically effective amount of at least one compound according to formula VI to a patient in need. In some embodiments, a method is described for treating anxiety, the method comprising: administering a therapeutically effective amount of at least one compound according to formula VI to a patient in need. In some embodiments, a method is described for treating substance abuse disorders, the method comprising: administering a therapeutically effective amount of at least one compound according to formula VI to a patient in need. In some embodiments, a method is described for treating pain, the method comprising: administering a therapeutically effective amount of at least one compound according to formula VI to a patient in need.

An illustrative embodiment of cannabinol derivatives and use thereof includes a compound or a pharmaceutically acceptable salt or a stereoisomer thereof according to Formula VII:

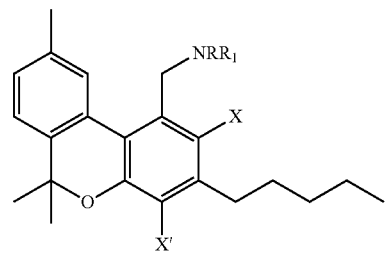

wherein: R and $R_1$ are independently selected from hydrogen, $-CO_2CH_2R_2-$, $SO_2CH_2R_2-$, $CONHR_2$, aryl, and alkyl, wherein the aryl or alkyl groups may have additional functionalization including but not limited to amino (primary, secondary, or tertiary), hydroxy, halogens (bromo, chloro, fluoro), nitro, methoxy, carboxy, alkyl, aryl, and sulfonic acid; $R_2$ is selected from alkyl, hydroalkyl, aminoalkyl, carboxyalkyl, alkoxy, vinyl, aryl, and acyl, and X and X' are independently selected from hydrogen, halogen, aryl, alkyl, and alkenyl.

In some embodiments, a method is described for treating cancer, the method comprising administering a therapeutically effective amount of at least one compound according to formula VII to a patient in need. In certain embodiments, a method is described for treating Parkinson's Disease, the method comprising: administering a therapeutically effective amount of at least one compound according to formula VII to a patient in need. In certain embodiments, a method is described for treating Alzheimer's Disease, the method comprising: administering a therapeutically effective amount of at least one compound according to formula VII to a patient in need. In some embodiments, a method is described for treating schizophrenia, the method comprising: administering a therapeutically effective amount of at least one compound according to formula VII to a patient in need. In some embodiments, a method is described for treating depression, the method comprising: administering a therapeutically effective amount of at least one compound according to formula VII to a patient in need. In some embodiments, a method is described for treating anxiety, the method comprising: administering a therapeutically effective amount of at least one compound according to formula VII to a patient in need. In some embodiments, a method is described for treating substance abuse disorders, the method comprising: administering a therapeutically effective amount of at least one compound according to formula VII to a patient in need. In some embodiments, a method is described for treating pain, the method comprising: administering a therapeutically effective amount of at least one compound according to formula VII to a patient in need.

One or more embodiments of the invention enable cannabidivarin derivatives and use thereof.

Cannabidivarin derivatives and use thereof is described. An illustrative embodiment of cannabidivarin derivatives and use thereof includes a compound or a pharmaceutically acceptable salt or a stereoisomer thereof according to Formula VIII

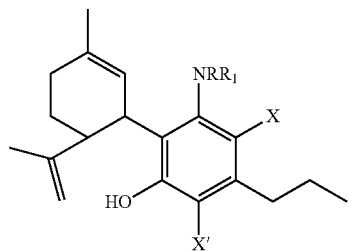

wherein: R and $R_1$ are independently selected from hydrogen, —$CO_2CH_2R_2$—, $SO_2CH_2R_2$—, $CONHR_2$, aryl, and alkyl, wherein the aryl or alkyl groups may have additional functionalization including but not limited to amino (primary, secondary, or tertiary), hydroxy, halogens (bromo, chloro, fluoro), nitro, methoxy, carboxy, alkyl, aryl, and sulfonic acid; $R_2$ is selected from alkyl, hydroalkyl, aminoalkyl, carboxyalkyl, alkoxy, vinyl, aryl, and acyl, and X and X' are independently selected from hydrogen, halogen, aryl, alkyl, and alkenyl.

In some embodiments, a method is described for treating cancer, the method comprising: administering a therapeutically effective amount of at least one compound according to formula VIII to a patient in need. In certain embodiments, a method is described for treating Parkinson's Disease, the method comprising: administering a therapeutically effective amount of at least one compound according to formula VIII to a patient in need. In certain embodiments, a method is described for treating Alzheimer's Disease, the method comprising: administering a therapeutically effective amount of at least one compound according to formula VIII to a patient in need. In some embodiments, a method is described for treating schizophrenia, the method comprising: administering a therapeutically effective amount of at least one compound according to formula VIII to a patient in need. In some embodiments, a method is described for treating depression, the method comprising: administering a therapeutically effective amount of at least one compound according to formula VIII to a patient in need. In some embodiments, a method is described for treating anxiety, the method comprising: administering a therapeutically effective amount of at least one compound according to formula VIII to a patient in need. In some embodiments, a method is described for treating substance abuse disorders, the method comprising: administering a therapeutically effective amount of at least one compound according to formula VIII to a patient in need. In some embodiments, a method is described for treating pain, the method comprising: administering a therapeutically effective amount of at least one compound according to formula VIII to a patient in need.

An illustrative embodiment of cannabidivarin derivatives and use thereof includes a compound or a pharmaceutically acceptable salt or a stereoisomer thereof according to Formula IX:

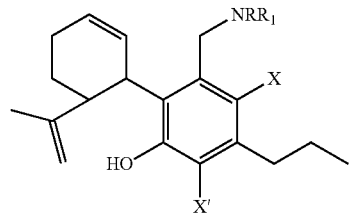

wherein: R and $R_1$ are independently selected from hydrogen, —$CO_2CH_2R_2$—, $SO_2CH_2R_2$—, $CONHR_2$, aryl, and alkyl, wherein the aryl or alkyl groups may have additional functionalization including but not limited to amino (primary, secondary, or tertiary), hydroxy, halogens (bromo, chloro, fluoro), nitro, methoxy, carboxy, alkyl, aryl, and sulfonic acid; $R_2$ is selected from alkyl, hydroalkyl, aminoalkyl, carboxyalkyl, alkoxy, vinyl, aryl, and acyl, and X and X' are independently selected from hydrogen, halogen, aryl, alkyl, and alkenyl.

In some embodiments, a method is described for treating cancer, the method comprising: administering a therapeutically effective amount of at least one compound according to formula IX to a patient in need. In certain embodiments, a method is described for treating Parkinson's Disease, the method comprising: administering a therapeutically effective amount of at least one compound according to formula IX to a patient in need. In certain embodiments, a method is described for treating Alzheimer's Disease, the method comprising: administering a therapeutically effective amount of at least one compound according to formula IX to a patient in need. In some embodiments, a method is described for treating schizophrenia, the method comprising: administering a therapeutically effective amount of at least one compound according to formula IX to a patient in need. In some embodiments, a method is described for treating depression, the method comprising: administering a therapeutically effective amount of at least one compound according to formula IX to a patient in need. In some embodiments, a method is described for treating anxiety, the method comprising: administering a therapeutically effective amount of at least one compound according to formula IX to a patient in need. In some embodiments, a method is described for treating substance abuse disorders, the method comprising: administering a therapeutically effective amount of at least one compound according to formula IX to a patient in need. In some embodiments, a method is described for treating pain, the method comprising: administering a therapeutically effective amount of at least one compound according to formula IX to a patient in need.

An illustrative embodiment of cannabichromene derivatives and use thereof includes a compound or a pharmaceutically acceptable salt or a stereoisomer thereof according to Formula X:

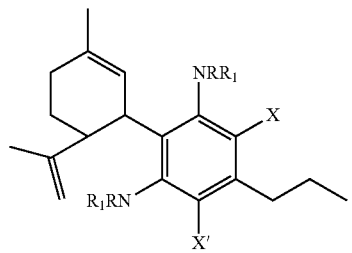

wherein: R and $R_1$ are independently selected from hydrogen, $-CO_2CH_2R_2-$, $SO_2CH_2R_2-$, $CONHR_2$, aryl, and alkyl, wherein the aryl or alkyl groups may have additional functionalization including but not limited to amino (primary, secondary, or tertiary), hydroxy, halogens (bromo, chloro, fluoro), nitro, methoxy, carboxy, alkyl, aryl, and sulfonic acid; $R_2$ is selected from alkyl, hydroalkyl, aminoalkyl, carboxyalkyl, alkoxy, vinyl, aryl, and acyl, and X and X' are independently selected from hydrogen, halogen, aryl, alkyl, and alkenyl.

In some embodiments, a method is described for treating cancer, the method comprising: administering a therapeutically effective amount of at least one compound according to formula X to a patient in need. In certain embodiments, a method is described for treating Parkinson's Disease, the method comprising: administering a therapeutically effective amount of at least one compound according to formula X to a patient in need. In certain embodiments, a method is described for treating Alzheimer's Disease, the method comprising: administering a therapeutically effective amount of at least one compound according to formula X to a patient in need. In some embodiments, a method is described for treating schizophrenia, the method comprising: administering a therapeutically effective amount of at least one compound according to formula X to a patient in need. In some embodiments, a method is described for treating depression, the method comprising: administering a therapeutically effective amount of at least one compound according to formula X to a patient in need. In some embodiments, a method is described for treating anxiety, the method comprising: administering a therapeutically effective amount of at least one compound according to formula X to a patient in need. In some embodiments, a method is described for treating substance abuse disorders, the method comprising administering a therapeutically effective amount of at least one compound according to formula X to a patient in need. In some embodiments, a method is described for treating pain, the method comprising: administering a therapeutically effective amount of at least one compound according to formula X to a patient in need.

An illustrative embodiment of cannabichromene derivatives and use thereof includes a compound or a pharmaceutically acceptable salt or a stereoisomer thereof according to Formula XI

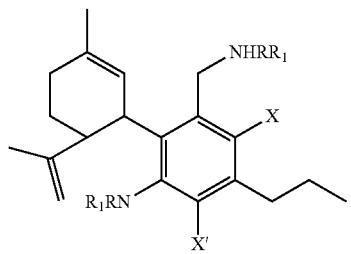

wherein: R and $R_1$ are independently selected from hydrogen, $-CO_2CH_2R_2-$, $SO_2CH_2R_2-$, $CONHR_2$, aryl, and alkyl, wherein the aryl or alkyl groups may have additional functionalization including but not limited to amino (primary, secondary, or tertiary), hydroxy, halogens (bromo, chloro, fluoro), nitro, methoxy, carboxy, alkyl, aryl, and sulfonic acid; $R_2$ is selected from alkyl, hydroalkyl, aminoalkyl, carboxyalkyl, alkoxy, vinyl, aryl, and acyl, and X and X' are independently selected from hydrogen, halogen, aryl, alkyl, and alkenyl.

In some embodiments, a method is described for treating cancer, the method comprising: administering a therapeutically effective amount of at least one compound according to formula XI to a patient in need. In certain embodiments, a method is described for treating Parkinson's Disease, the method comprising: administering a therapeutically effective amount of at least one compound according to formula XI to a patient in need. In certain embodiments, a method is described for treating Alzheimer's Disease, the method comprising: administering a therapeutically effective amount of at least one compound according to formula XI to a patient in need. In some embodiments, a method is described for treating schizophrenia, the method comprising: administering a therapeutically effective amount of at least one compound according to formula XI to a patient in need. In some embodiments, a method is described for treating depression, the method comprising: administering a therapeutically effective amount of at least one compound according to formula XI to a patient in need. In some embodiments, a method is described for treating anxiety, the method comprising: administering a therapeutically effective amount of at least one compound according to formula XI to a patient in need. In some embodiments, a method is described for treating substance abuse disorders, the method comprising: administering a therapeutically effective amount of at least one compound according to formula XI to a patient in need. In some embodiments, a method is described for treating pain, the method comprising: administering a therapeutically effective amount of at least one compound according to formula XI to a patient in need.

Cancer

According to an aspect of some embodiments of the present invention, there is provided a method for treating cancer in a subject (a subject afflicted by the tumor), the method comprising administering any of the compounds described herein.

According to an aspect of some embodiments of the present invention, there is provided a method for inhibiting growth of cells or tissue of a tumor in a subject (a subject afflicted by the tumor), the method comprising administering any of the compounds described herein.

As used herein throughout, the term "tumor" describes a plurality of cells or a tissue composed of the plurality of cells that are characterized by abnormal cell growth and which serve no physiological function.

By "abnormal cell growth" it is meant uncontrolled, progressive proliferation of the cells, which is no longer under normal bodily control. The growth of a tumor tissue typically exceeds, and is uncoordinated with, that of the normal cells or tissues around it.

The term "tumor" is also referred to herein and in the art as "neoplastic tissue" encompasses benign, pro-malignant and malignant tumors.

An agent that inhibits cell growth can thus do so by either inhibiting proliferation or stimulating cell death, or both, such that the equilibrium between these two opposing processes is altered.

The phrase "inhibiting cell growth" describes altering the equilibrium between cells proliferation and cell death such that a rate of cell death is increased and is higher than the proliferation rate, resulting in a reduced or nullified number of viable cells. Thus, this phrase encompasses reducing or inhibiting proliferation of cells, killing cells, and/or reducing a volume of a tissue formed of the cells (a tumor tissue).

A tumor as described herein can be a primary tumor or a secondary tumor.

The term "malignant tumor" describes a tumor that is not self-limited in its growth, is capable of invading into adjacent tissues, and may be capable of spreading to distant tissues (metastasizing). The term "benign tumor" describes a tumor which is not malignant (i.e. does not grow in an unlimited, aggressive manner, does not invade surrounding tissues, and does not metastasize).

The term "primary tumor" describes a tumor that is at the original site where it first arose.

The term "secondary tumor" describes a tumor that has spread from its original (primary) site of growth to another site, close to or distant from the primary site, and is also referred to herein and in the art as metastasis, or as metastasizing tumor. The term "secondary tumor" as used herein also describes recurrent tumor, which can ne at the original site as the primary tumor and/or at another site, as a metastasizing tumor.

According to some of any of the embodiments described herein, the tumor is a malignant tumor, for example, a malignant cancerous tumor, and the tumor cells are cancer or cancerous cells.

According to these embodiments, the methods and uses as described herein in any of the respective embodiments are for treating and/or controlling cancer or a cancerous tumor is a subject in need thereof.

The methods and uses as described herein are for treating a subject having a primary cancer tumor, a metastasizing cancer and/or a recurrent cancer, as described herein.

The term "cancer" encompasses malignant and benign tumors as well as disease conditions evolving from primary or secondary tumors, as described herein.

Examples of benign tumors include, without limitation, lipomas, chondromas, adenomas, pilomatricomas, teratomas, and hamartomas.

Cancers treatable according to embodiments of the invention include, but are not limited to, carcinomas, sarcomas, blastomas, and germ cell tumors. Carcinomas include, without limitation, adenocarcinomas (e.g., small cell lung cancer, kidney, uterus, prostate, bladder, ovary and/or colon adenocarcinoma) and epithelial carcinomas.

Examples of cancers treatable according to embodiments of the invention include, without limitation, adenocarcinoma, adrenal tumors (e.g., hereditary adrenocortical carcinoma), biliary tract tumors, bladder cancer, bone cancer, brain cancer, breast cancer (e.g., ductal breast cancer, invasive intraductal breast cancer, sporadic breast cancer, susceptibility to breast cancer, type 4 breast cancer, breast cancer-1, breast cancer-3, and/or breast-ovarian cancer), bronchogenic large cell carcinoma, cervical cancer (e.g., cervical carcinoma), carcinosarcoma, choriocarcinoma, cystadenocarcinoma, dermatofibrosarcoma protuberans, ductal carcinoma, Ehrlich-Lettre ascites, embryonal rhabdomyosarcoma, endocrine neoplasia, endometrial cancer (e.g., endometrial carcinoma), ependimoblastoma, epidermoid carcinoma, epithelial adult tumor, epithelioma, erythroleukemia (e.g., Friend and/or lymphoblast), extraskeletal myxoid chondrosarcoma, fibrosarcoma, gallbladder carcinoma, ganglioblastoma, gastrointestinal tract tumors (e.g., colon carcinoma, rectal carcinoma, colorectal carcinoma, colorectal cancer, colorectal adenoma, hereditary nonpolyposis type 1, hereditary nonpolyposis type 2, hereditary nonpolyposis type 3, hereditary nonpolyposis type 6, hereditary nonpolyposis type 7, small and/or large bowel carcinoma, esophageal carcinoma, tylosis with esophageal cancer, stomach carcinoma, pancreatic carcinoma, and/or pancreatic endocrine tumors), germ cell tumor (male germ cell tumor, and/or testicular and/or ovarian dysgerminoma), giant cell tumor, glial tumor, glioma, glioblastoma (e.g., glioblastoma multiforme, astrocytoma), head & neck cancer, heterohybridoma, heteromyeloma, histiocytoma, hybridoma (e.g., B-cell), hypernephroma, insulinoma, islet tumor, keratoma, large cell carcinoma, leiomyoblastoma, leiomyosarcoma, leukemia (e.g., acute lymphatic leukemia, acute lymphoblastic leukemia, acute lymphoblastic pre-B cell leukemia, acute lymphoblastic T cell leukemia, acute megakaryoblastic leukemia, monocytic leukemia, acute myelogenous leukemia, acute myeloid leukemia, acute myeloid leukemia with eosinophilia, B-cell leukemia, basophilic leukemia, chronic myeloid leukemia, chronic B-cell leukemia, eosinophilic leukemia, Friend leukemia, granulocytic or myelocytic leukemia, hairy cell leukemia, lymphocytic leukemia, mast cell leukemia, megakaryoblastic leukemia, monocytic leukemia, monocytic-macrophage leukemia, myeloblastic leukemia, myeloid leukemia, myelomonocytic leukemia, plasma cell leukemia, pre-B cell leukemia, promyelocytic leukemia, subacute leukemia, T-cell leukemia, lymphoid neoplasm, predisposition to myeloid malignancy, and/or acute nonlymphocytic leukemia), Li-Fraumeni syndrome, liposarcoma, liver cancer (e.g., hepatoblastoma, hepatocellular carcinoma, hepatocellular cancer, and/or hepatoma), lung cancer (e.g., Lewis lung carcinoma, small cell carcinoma and/or non-small cell carcinoma) lymphoma (e.g., Hodgkin's disease, non-Hodgkin's lymphoma, B-cell lymphoma, diffuse large B-cell lymphoma (DLBCL), Burkitt lymphoma, cutaneous T-cell lymphoma, histiocytic lymphoma, lymphoblastic lymphoma, T-cell lymphoma, and/or thymic lymphoma), lymphosarcoma, lynch cancer family syndrome II, mammary tumor, mastocytoma, medulloblastoma, medullary carcinoma, melanoma, mesothelioma, metastatic tumor, monocyte tumor, mucoepidermoid carcinoma, multiple glomus tumors, multiple meningioma, myelodysplastic syndrome, myeloma (e.g., multiple myeloma), nasopharyngeal cancer, nephroblastoma, nervous tissue glial tumor, nervous tissue neuronal tumor, neurinoma, neuroblastoma, neurogenic tumor, non-melanoma skin cancer, oat cell carcinoma, oligodendroglioma, osteochondroma, osteomyeloma, ovarian cancer (e.g., epithelial ovarian cancer, ovarian carcinoma, serous ovarian cancer, and/or ovarian sex cord tumors), papillary carcinoma, papilloma, paraganglioma (e.g., familial nonchromaffin), pheochromocytoma, pituitary tumor (invasive), placental site trophoblastic tumor, plasmacytoma, prostate cancer (e.g., prostate adenocarcinoma), renal cancer (e.g., Wilms' tumor type 2 or type 1), retinoblastoma, rhabdoid tumors (e.g., rhabdoid predisposition syndrome), rhabdomyosarcoma, sacrococcygeal tumor, sarcoma (e.g., Ewing's sarcoma, histiocytic cell sarcoma, Jensen sarcoma, myxosarcoma, osteosarcoma, reticulum cell sarcoma, soft tissue sarcoma and/or synovial sarcoma), schwannoma, small cell carcinoma, spindle cell carcinoma, spinocellular carcinoma, squamous cell carcinoma (e.g., in head and neck), subcutaneous tumor, teratocarcinoma (e.g., pluripotent), teratoma (e.g., immature teratoma of ovary), testicular cancer (e.g. testicular germ cell tumor), transitional cell carcinoma, Turcot syndrome with glioblastoma, thymoma, thyroid cancer (e.g., follicular, medullary and/or papillary thyroid cancer), trichoepithelioma, trophoblastic tumor, undifferentiated carcinoma, uterine cancer, uterine cervix carcinoma.

Methods and uses of the present embodiments can be used to treat one or more solid tumors.

As used herein, the term "solid tumor" refers to those conditions, such as cancer, that form an abnormal tumor mass, such as sarcomas, carcinomas, and lymphomas. For example, solid tumors can include, but are not limited to, ovarian tumors, prostate tumors, skin tumors, lung tumors, breast tumors, liver tumors, brain tumors, CNS tumors, kidney tumors, colon tumors, bladder tumors, intestinal tumors, melanomas, gliomas, ependymomas, oligodendrogliomas, oligoastrocytomas, astrocytomas, glioblastomas, and medulloblastomas. Suitable examples of solid tumor diseases include, but are not limited to, non-small cell lung cancer (NSCLC), neuroendocrine tumors, thyomas, fibrous tumors, metastatic colorectal cancer (mCRC), and the like. In certain embodiments, the solid tumor disease is an adenocarcinoma, squamous cell carcinoma, large cell carcinoma, and the like.

According to some embodiments, the cancer is or comprises a solid tumor, and can be, for example, adenocarcinoma, adrenal tumors (e.g., hereditary adrenocortical carcinoma), biliary tract tumors, bladder cancer, bone cancer, brain cancer, breast cancer (e.g., ductal breast cancer, invasive intraductal breast cancer, sporadic breast cancer, susceptibility to breast cancer, type 4 breast cancer, breast cancer-1, breast cancer-3, and/or breast-ovarian cancer), bronchogenic large cell carcinoma, cervical cancer (e.g., cervical carcinoma), carcinosarcoma, choriocarcinoma, cystadenocarcinoma, dermatofibrosarcoma protuberans, ductal carcinoma, Ehrlich-Lettre ascites, embryonal rhabdomyosarcoma, endocrine neoplasia, endometrial cancer (e.g., endometrial carcinoma), ependimoblastoma, epidermoid carcinoma, epithelial adult tumor, epithelioma, extraskeletal myxoid chondrosarcoma, fibrosarcoma, gallbladder carcinoma, ganglioblastoma, gastrointestinal tract tumors (e.g., colon carcinoma, rectal carcinoma, colorectal carcinoma, colorectal cancer, colorectal adenoma, hereditary nonpolyposis type 1, hereditary nonpolyposis type 2, hereditary nonpolyposis type 3, hereditary nonpolyposis type 6, hereditary nonpolyposis type 7, small and/or large bowel carcinoma, esophageal carcinoma, tylosis with esophageal cancer, stomach carcinoma, pancreatic carcinoma, and/or pancreatic endocrine tumors), germ cell tumor (male germ cell tumor, and/or testicular and/or ovarian dysgerminoma), giant cell tumor, glial tumor, glioma, glioblastoma (e.g., glioblastoma multiforme, astrocytoma), head & neck cancer, heterohybridoma, heteromyeloma, histiocytoma, hybridoma (e.g., B-cell), hypernephroma, insulinoma, islet tumor, keratoma, large cell carcinoma, leiomyoblastoma, liposarcoma, liver cancer (e.g., hepatoblastoma, hepatocellular carcinoma, hepatocellular cancer, and/or hepatoma), lung cancer (e.g., Lewis lung carcinoma, small cell carcinoma and/or non-small cell carcinoma) lymphoma (e.g., Hodgkin's disease, non-Hodgkin's lymphoma, B-cell lymphoma, diffuse large B-cell lymphoma (DLBCL), Burkitt lymphoma, cutaneous T-cell lymphoma, histiocytic lymphoma, lymphoblastic lymphoma, T-cell lymphoma, and/or thymic lymphoma), lymphosarcoma, lynch cancer family syndrome II, mammary tumor, mastocytoma, medulloblastoma, medullary carcinoma, melanoma, mesothelioma, metastatic tumor, monocyte tumor, mucoepidermoid carcinoma, multiple glomus tumors, multiple meningioma, myelodysplastic syndrome, myeloma (e.g., multiple myeloma), nasopharyngeal cancer, nephroblastoma, nervous tissue glial tumor, nervous tissue neuronal tumor, neurinoma, neuroblastoma, neurogenic tumor, non-melanoma skin cancer, oat cell carcinoma, oligodendroglioma, osteochondroma, osteomyeloma, ovarian cancer (e.g., epithelial ovarian cancer, ovarian carcinoma, serous ovarian cancer, and/or ovarian sex cord tumors), papillary carcinoma, papilloma, paraganglioma (e.g., familial nonchromaffin), pheochromocytoma, pituitary tumor (invasive), placental site trophoblastic tumor, plasmacytoma, prostate cancer (e.g., prostate adenocarcinoma), renal cancer (e.g., Wilms' tumor type 2 or type 1), retinoblastoma, rhabdoid tumors (e.g., rhabdoid predisposition syndrome), rhabdomyosarcoma, sacrococcygeal tumor, sarcoma (e.g., Ewing's sarcoma, histiocytic cell sarcoma, Jensen sarcoma, myxosarcoma, osteosarcoma, reticulum cell sarcoma, soft tissue sarcoma and/or synovial sarcoma), schwannoma, small cell carcinoma, spindle cell carcinoma, spinocellular carcinoma, squamous cell carcinoma (e.g., in head and neck), subcutaneous tumor, teratocarcinoma (e.g., pluripotent), teratoma (e.g., immature teratoma of ovary), testicular cancer (e.g. testicular germ cell tumor), transitional cell carcinoma, Turcot syndrome with glioblastoma, thymoma, thyroid cancer (e.g., follicular, medullary and/or papillary thyroid cancer), trichoepithelioma, trophoblastic tumor, undifferentiated carcinoma, uterine cancer, uterine cervix carcinoma. According to some embodiments, the cancer is or comprises leukemia, non-small cell lung cancer (NSCLC), colon cancer, CNS cancer, melanoma, ovarian cancer, renal cancer, prostate cancer, or breast cancer. According to some embodiments, the cancer is or comprises leukemia. According to some embodiments, the cancer is or comprises non-small cell lung cancer (NSCLC). According to some embodiments, the cancer is or comprises colon cancer. According to some embodiments, the cancer is or comprises CNS cancer. According to some embodiments, the cancer is or comprises melanoma. According to some embodiments, the cancer is or comprises ovarian cancer. According to some embodiments, the cancer is or comprises renal cancer. According to some embodiments, the cancer is or comprises prostate cancer. According to some embodiments, the cancer is or comprises breast cancer.

Combination Therapy

According to some of any of the embodiments described herein, in any of the methods and uses and systems as described herein, administration of a compound according to the invention can be used in combination with an additional therapy for treating the disease associated with the tumor (e.g., cancer). According to some of any of the embodiments described herein, the additional therapy for treating the disease associated with the tumor (e.g., cancer) is an anti-cancer therapy.

Suitable anti-cancer therapy includes, for example, chemotherapy, radiotherapy, phototherapy and/or photodynamic therapy, surgery, nutritional therapy, ablative therapy, combined radiotherapy and chemotherapy, brachiotherapy, proton beam therapy, immunotherapy, cellular therapy and photon beam radiosurgical therapy, and any combination of the foregoing.

Chemotherapeutic drugs (e.g., anti-cancer drugs) that may optionally be co-administered to the subject prior to, concomitant with and/or subsequent to administration of a compound as described herein in any of the respective embodiments include, but are not limited to acivicin, aclarubicin, acodazole, acronine, adozelesin, aldesleukin, altretamine, ambomycin, ametantrone, aminoglutethimide, amsacrine, anastrozole, anthramycin, asparaginase, asperlin, azacitidine, azetepa, azotomycin, batimastat, benzodepa, bicalutamide, bisantrene, bisnafide, bizelesin, bleomycin, brequinar, bropirimine, busulfan, cactinomycin, calusterone, caracemide, carbetimer, carboplatin, carmustine, carubicin, carzelesin, cedefingol, chlorambucil, cirolemycin, cisplatin, cladribine, crisnatol, cyclophosphamide, cytarabine, dacarbazine, dactinomycin, daunorubicin, decitabine, dexormaplatin, dezaguanine, diaziquone, docetaxel, doxorubicin, droloxifene, dromostanolone, duazomycin, edatrexate, eflornithine, elsamitrucin, enloplatin, enpromate, epipropidine, epirubicin, erbulozole, esorubicin, estramustine, etanidazole, etoposide, etoprine, fadrozole, fazarabine, fenretinide, floxuridine, fludarabine, fluorouracil, flurocitabine, fosquidone, fostriecin, gemcitabine, hydroxyurea, idarubicin, ifosfamide, ilmofosine, interferon alfa-2a, interferon alfa-2b, interferon alfa-n1, interferon alfa-n3, interferon beta-Ia, interferon gamma-Ib, iproplatin, irinotecan, lanreotide, letrozole, leuprolide, liarozole, lometrexol, lomustine, losoxantrone, masoprocol, maytansine, mechlorethamine, megestrol, melengestrol, melphalan, menogaril, mercaptopurine, methotrexate, metoprine, meturedepa, mitindomide, mitocarcin, mitocromin, mitogillin, mitomalcin, mitomycin, mitosper, mitotane, mitoxantrone, mycophenolic acid, nocodazole, nogalamycin, ormaplatin, oxisuran, paclitaxel, pegaspargase, peliomycin, pentamustine, peplomycin, perfosfamide, pipobroman, piposulfan, piroxantrone, plicamycin, plomestane, porfimer, porfiromycin, prednimustine, procarbazine, puromycin, pyrazofurin, riboprine, rogletimide, safingol, semustine, simtrazene, sparfosate, sparsomycin, spirogermanium, spiromustine, spiroplatin, streptonigrin, streptozocin, sulofenur, talisomycin, tecogalan, tegafur, teloxantrone, temoporfin, teniposide, teroxirone, testolactone, thiamiprine, thioguanine, thiotepa, tiazofurin, tirapazamine, topotecan, toremifene, trestolone, triciribine, trimetrexate, triptorelin, tubulozole, uracil mustard, uredepa, vapreotide, verteporfin, vinblastine, vincristine, vindesine, vinepidine, vinglycinate, vinleurosine, vinorelbine, vinrosidine, vinzolidine, vorozole, zeniplatin, zinostatin, zorubicin, and any pharmaceutically acceptable salts thereof.

In some embodiments, the anti-cancer therapy comprises immunotherapy, including, for example, checkpoint inhibitors, CAR-T cell therapy, and/or vaccine adjuvants (e.g., interferon or saponin), and immune-adjuvants, such as aluminum salts, organic adjuvants, and genomic material-based adjuvants, such as CpG. Anti-tumor immunity can be further augmented by inhibition of immune suppressor cells.

According to some embodiments, the anti-cancer therapy comprises administration of an anti-cancer immune modulator agent. As used herein, the term "anti-cancer immune modulator agent" refers to an agent capable of eliciting an immune response (e.g. T cell, NK cell) against a cancerous cell. Exemplary such agents include a cancer antigen, a cancer vaccine, an anti-cancer antibody, a cytokine capable of inducing activation and/or proliferation of a T cell and an immune-check point regulator. Alternatively or additionally, such modulators may be immune stimulators such as immune-check point regulators which are of specific value in the treatment of cancer.

As used herein the term "immune-check point regulator" refers to a molecule that modulates the activity of one or more immune-check point proteins in an agonistic or antagonistic manner resulting in activation of an immune cell.

As used herein the term "immune-check point protein" refers to a protein that regulates an immune cell activation or function. Immune check-point proteins can be either co-stimulatory proteins (i.e. transmitting a stimulatory signal resulting in activation of an immune cell) or inhibitory proteins (i.e. transmitting an inhibitory signal resulting in suppressing activity of an immune cell). According to some embodiments, the immune check-point protein regulates activation or function of a T cell. Numerous checkpoint proteins are known in the art and include, but not limited to, PD1, PDL-1, B7H2, B7H4, CTLA-4, CD80, CD86, LAG-3, TIM-3, KIR, IDO, CD19, OX40, 4-1BB (CD137), CD27, CD70, CD40, GITR, CD28 and ICOS (CD278).

According to some embodiments, the anti-cancer therapy comprises a surgical procedure, for example, resection or excision of at least a portion of the tumor.

EXAMPLES

Example 1—Cancer Cell Screening

Figure 2:
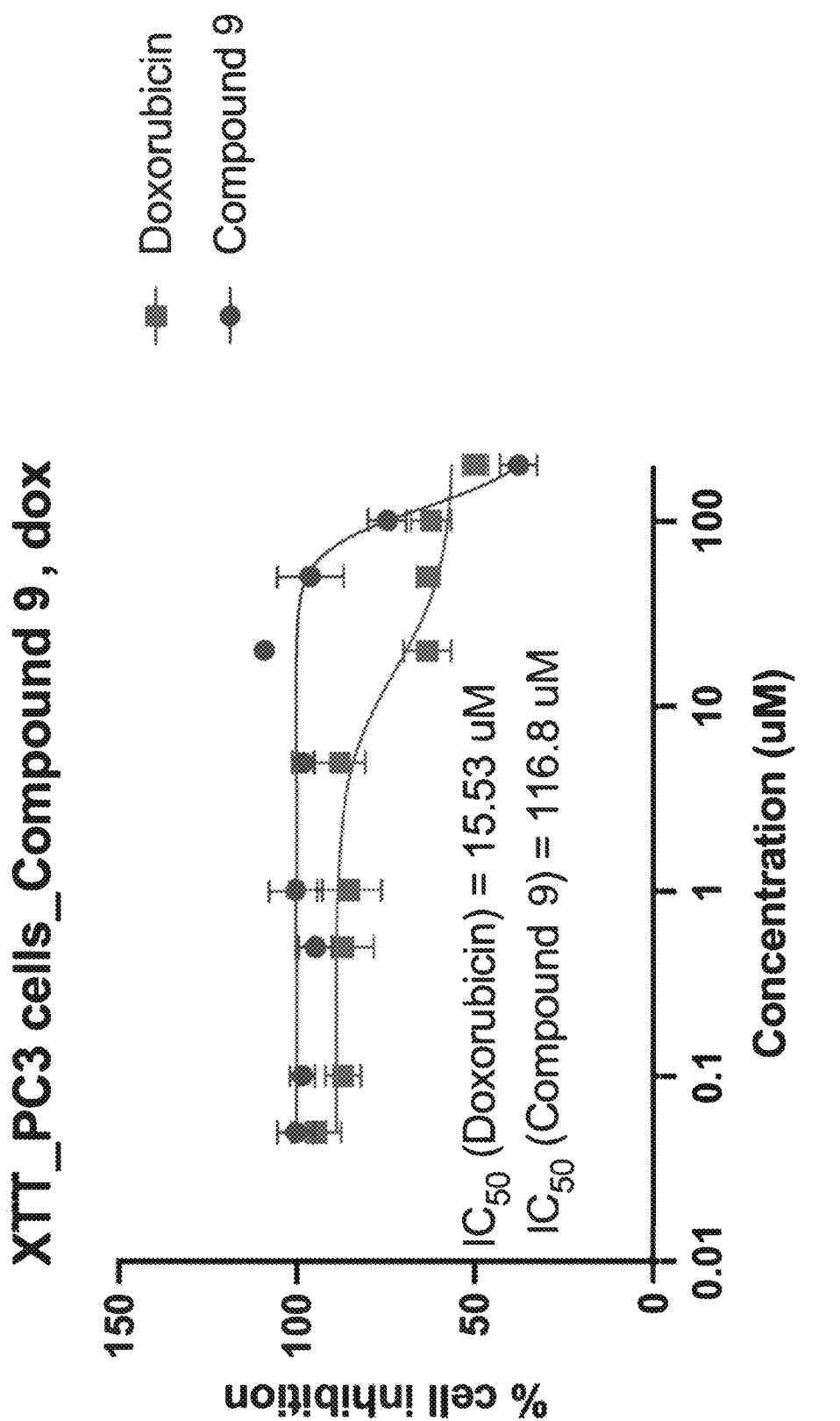
FIG. 2 provides data from a multiple dose study (dose-response) performed in prostate cancer PC3 cells.
Figure 3:
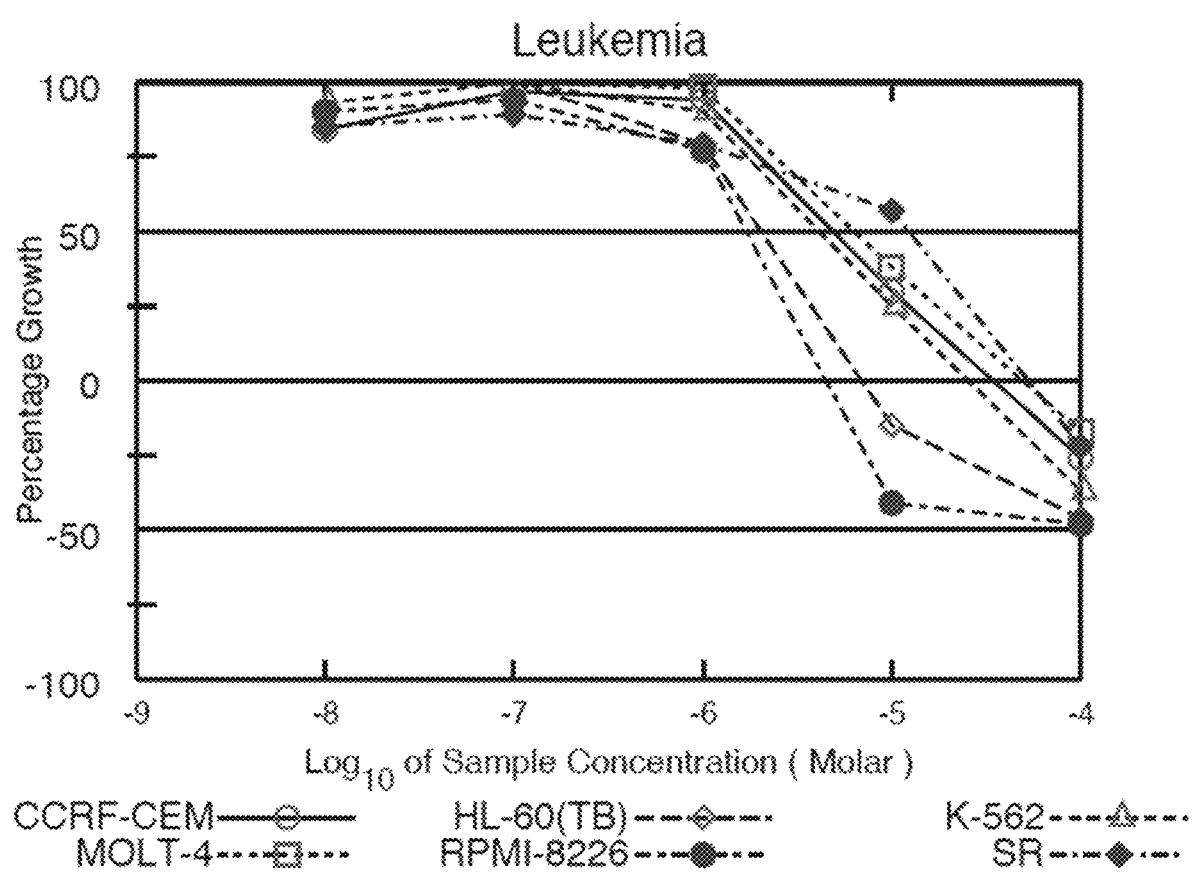
FIG. 3 provides data for Compound 8 in various leukemia cell lines.
Figure 4:
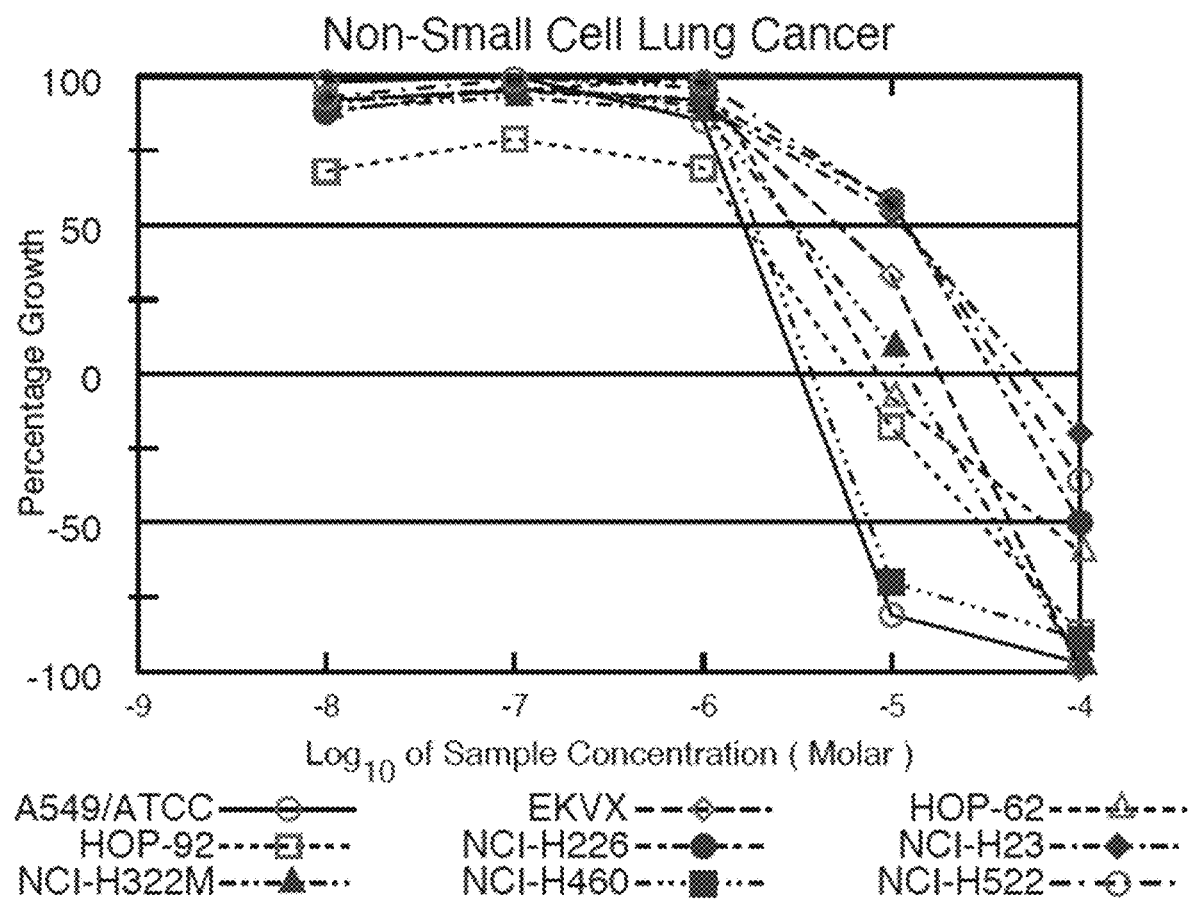
FIG. 4 provides data for Compound 8 in various non-small cell cancer cell lines.
Figure 5:
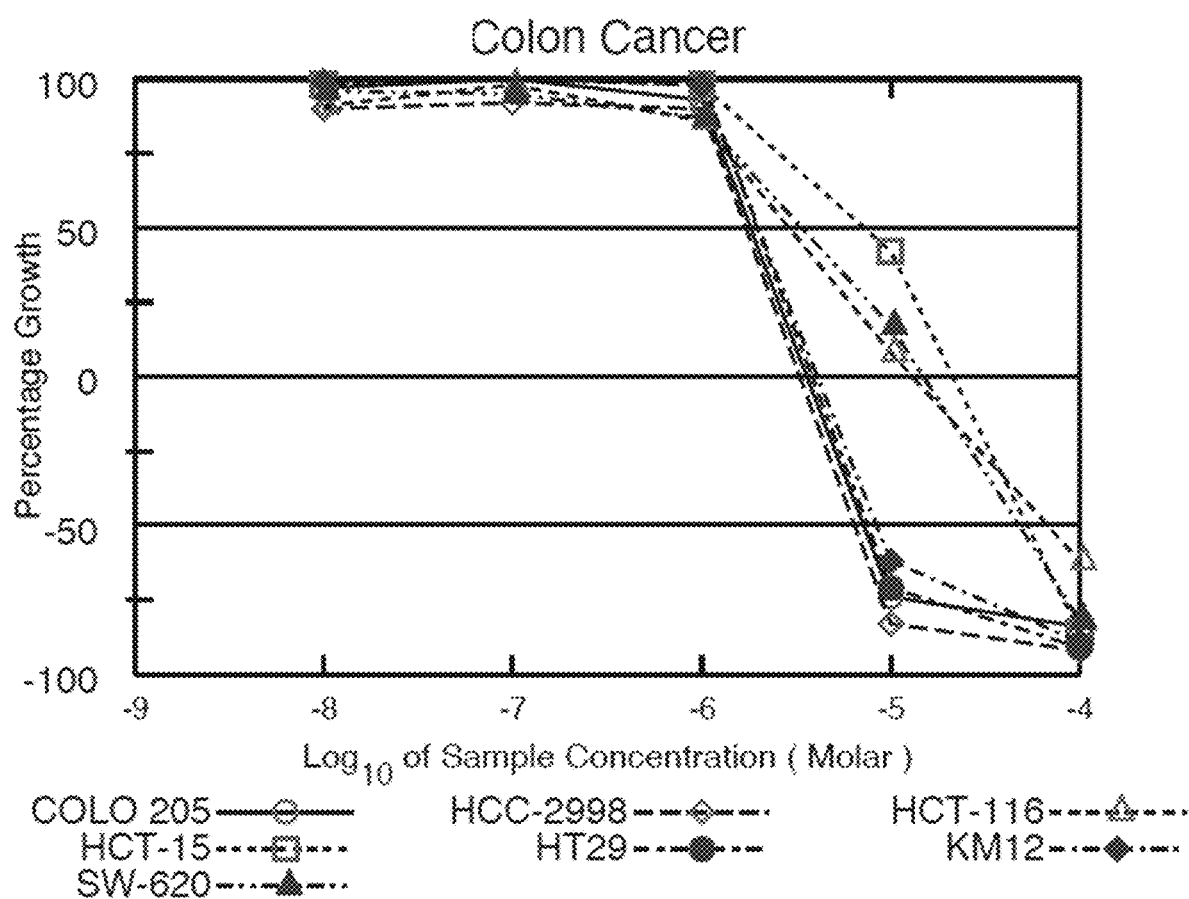
FIG. 5 provides data for Compound 8 in various colon cancer cell lines.
Figure 6:
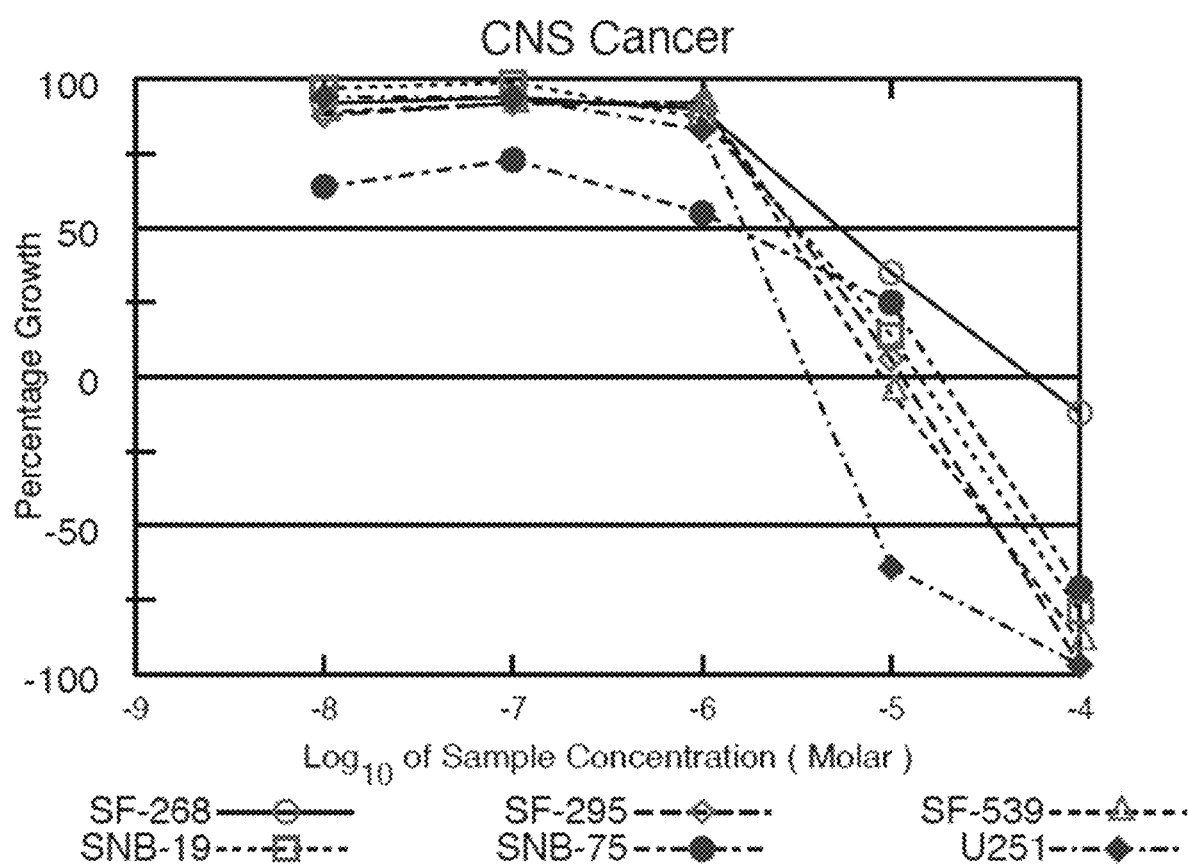
FIG. 6 provides data for Compound 8 in various CNS cancer cell lines.
Figure 7:
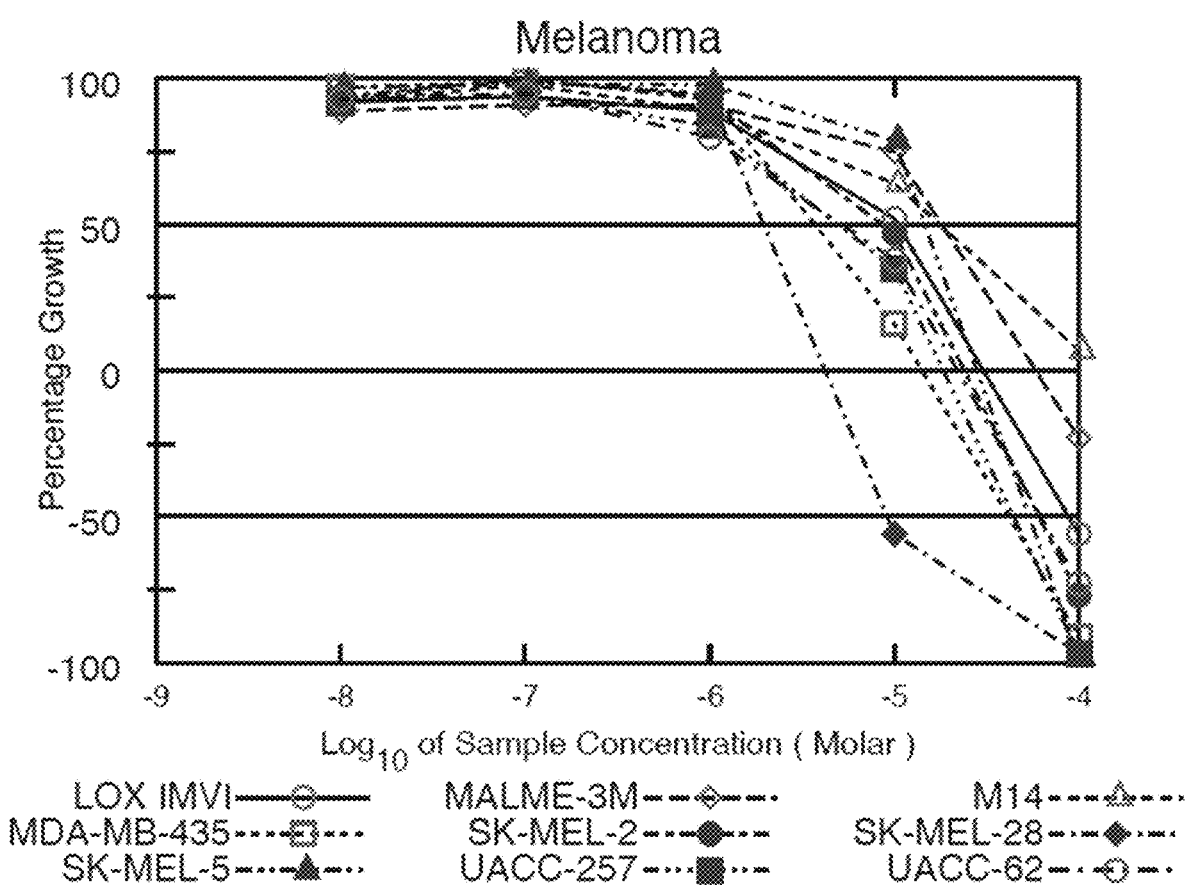
FIG. 7 provides data for Compound 8 in various melanoma cell lines.
Figure 8:
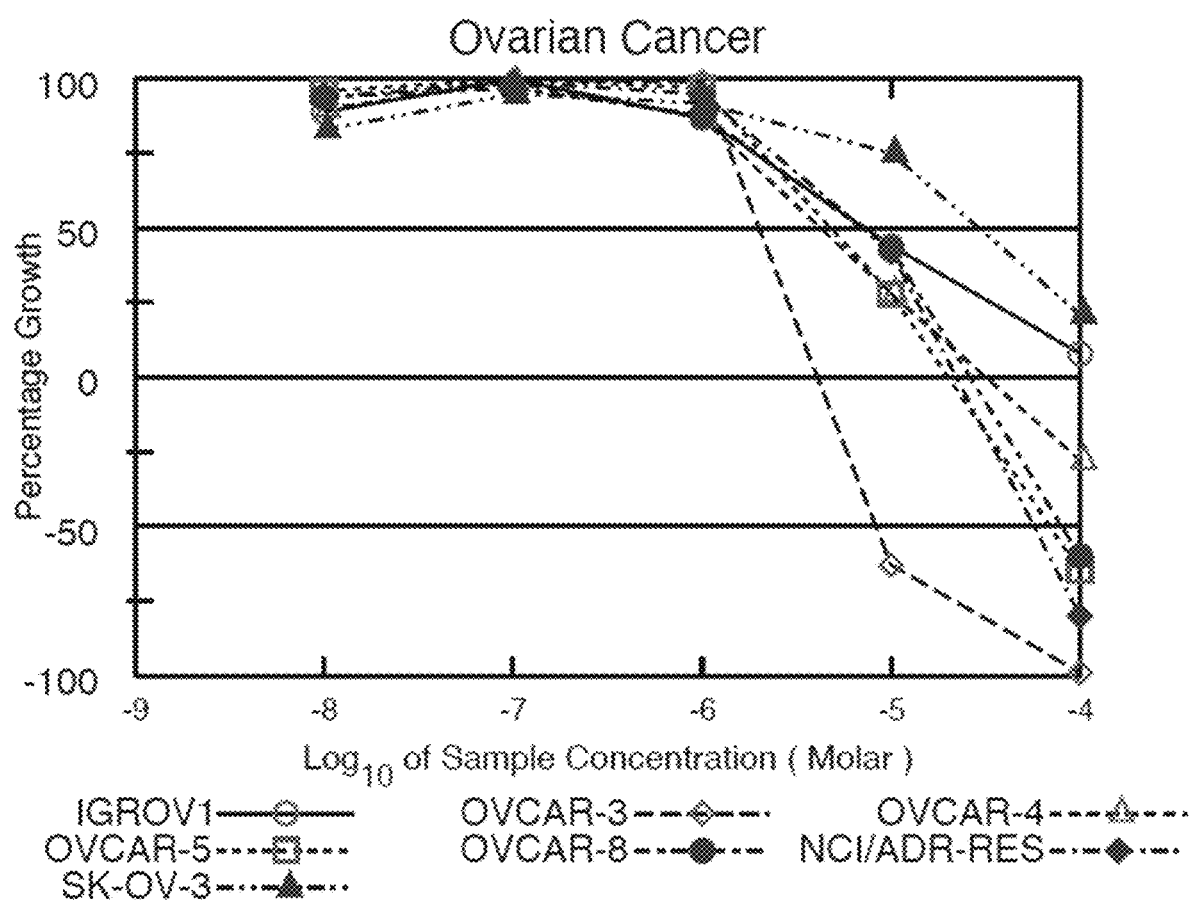
FIG. 8 provides data for Compound 8 in various ovarian cancer cell lines.
Figure 9:
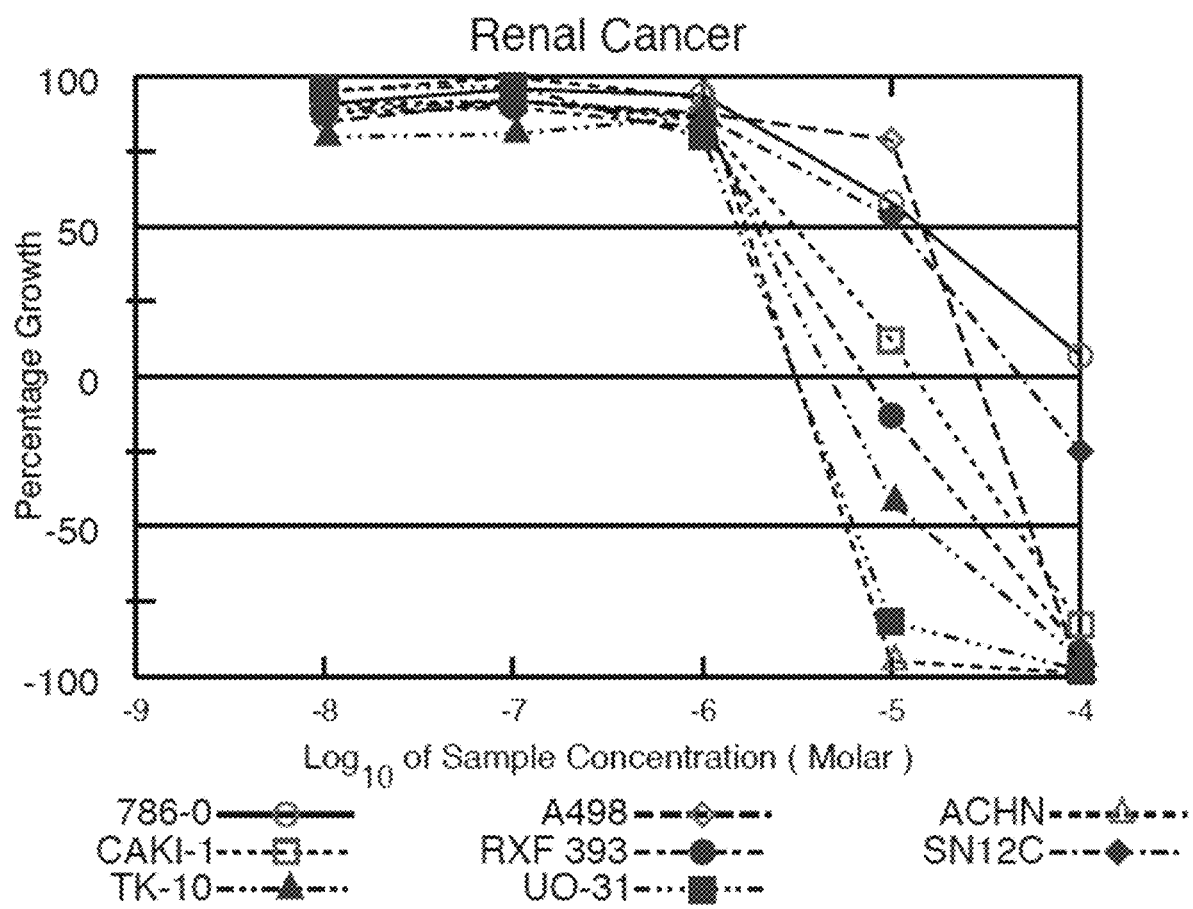
FIG. 9 provides data for Compound 8 in various renal cancer cell lines.
Figure 10:
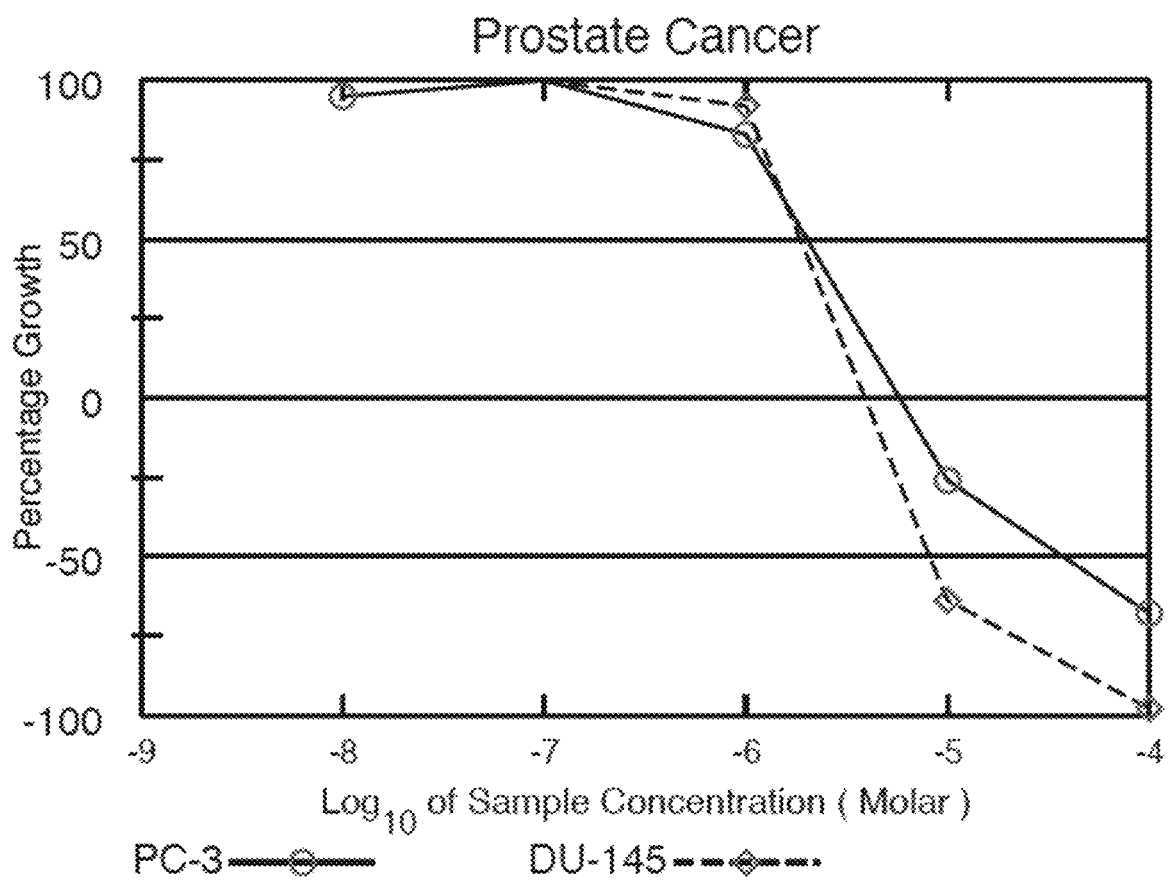
FIG. 10 provides data for Compound 8 in various prostate cancer cell lines.
Figure 11:
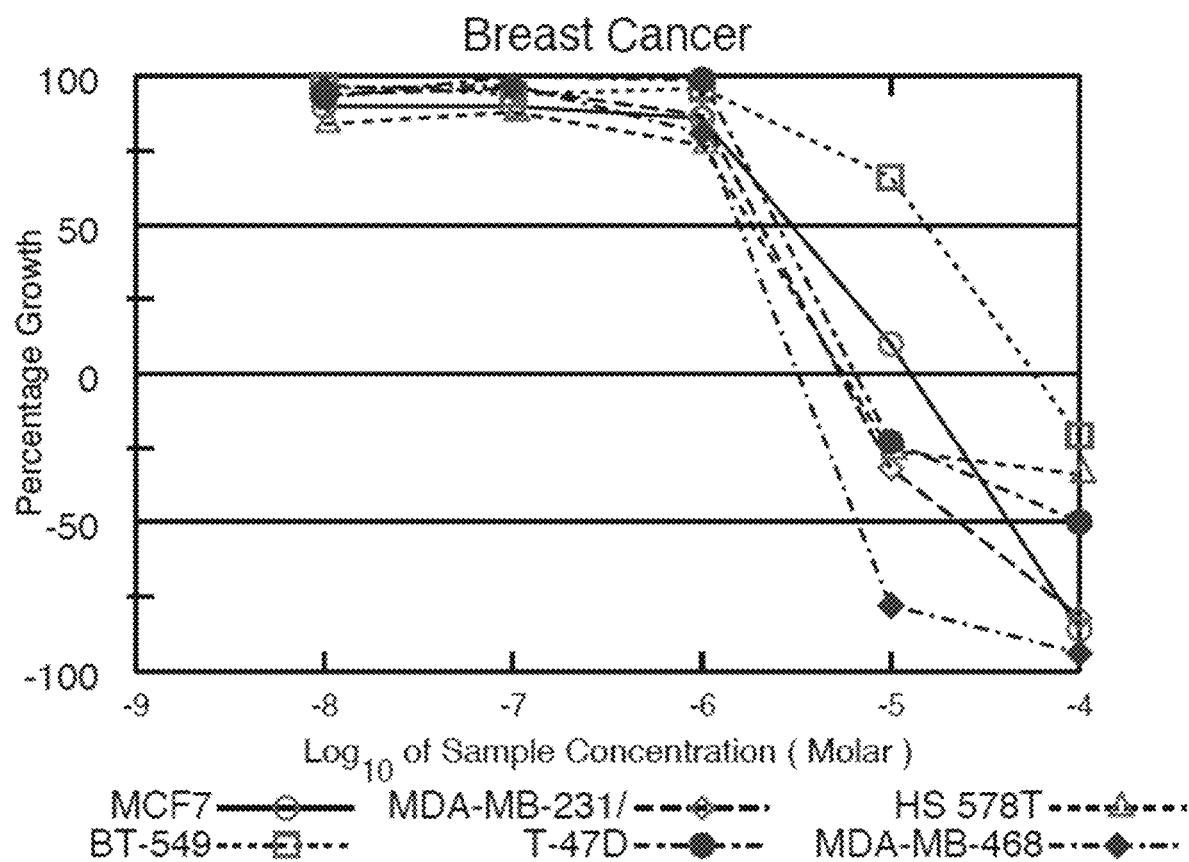
FIG. 11 provides data for Compound 8 in various breast cancer cell lines.

Several compounds were tested at a single concentration of 10 UM for their ability to inhibit cancer cell growth, and showed excellent growth inhibition against cancer cell lines (data not shown). A multiple dose study (dose-response) was then performed using Compound 8 across multiple cancer cell lines. FIGS. 3-11 demonstrate that Compound 8 provided growth inhibition across these cancer cell lines. A multiple dose study (dose-response) was then performed in PC3 cells using Compound 9. The results indicate that Compound 9 inhibits the growth of PC3 cells. (See FIG. 2) The data was generated according to the National Cancer Institute (NCI) 60 cell cancer screen.

Example 2—CNS Receptor Testing

The compounds were tested for affinity at various central nervous system receptors. For example, Compounds 10 and 12 showed good affinity and selectivity for the dopamine transporter (DAT) with Ki of 85 and 107 nM respectively. As a comparison, the positive control dopamine inhibitor GBR 12909 (1-(2-bis(4-fluorphenyl)-methoxy)-ethyl)-4-(3-phenyl-propyl)piperazine) has a Ki of 6.6 nM. Some compounds show low affinity for the mu-opioid receptor and a human calcium channel (data not shown). Compounds that target DAT are known to treat ADHD and narcolepsy and have potential for treating other disorders such as substance abuse.

While this invention has been particularly shown and described with references to preferred embodiments thereof, it will be understood by those skilled in the art that various changes in form and details may be made therein without departing from the scope of the invention encompassed by the appended claims.

What is claimed is:

1. A compound or a pharmaceutically acceptable salt or a stereoisomer thereof according to Formula I:

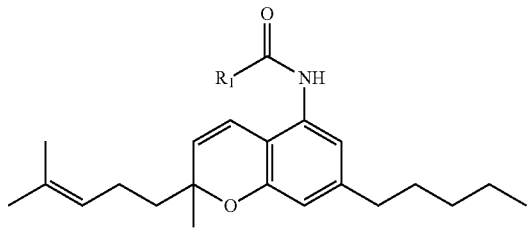

wherein:

wherein: $R_1$ is alkyl, cycloalkyl, or aryl, wherein alkyl, cycloalkyl, or aryl groups may be substituted with hydroxy, alkoxy, halogen, nitro, carboxy, alkyl, aryl, and sulfonic acid.

2. The compound according to claim 1, wherein Riis substituted or unsubstituted alkyl.

3. The compound according to claim 2, wherein the alkyl is substituted with 1, 2, or 3 halogens.

4. The compound according to claim 3, wherein the alkyl is methyl or ethyl.

5. The compound according to claim 1, wherein Riis substituted or unsubstituted cycloalkyl.

6. The compound according to claim 1, wherein Riis substituted or unsubstituted aryl.

7. The compound according to claim 1, wherein the compound is selected from

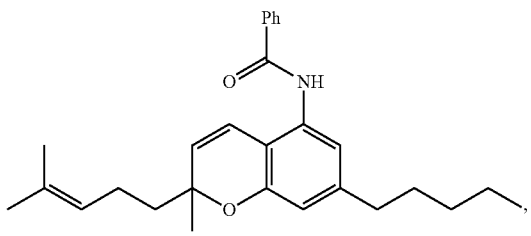

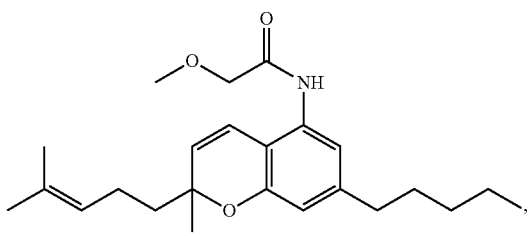

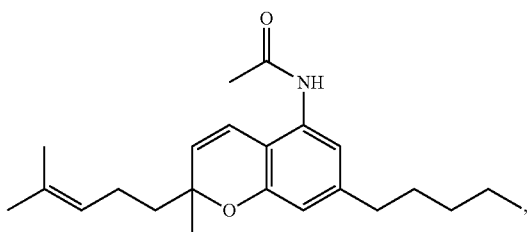

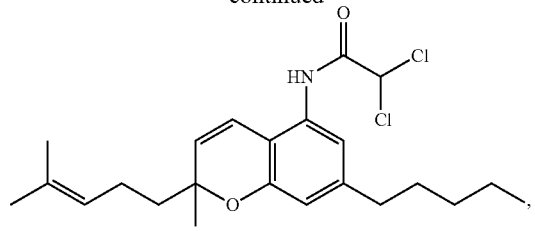

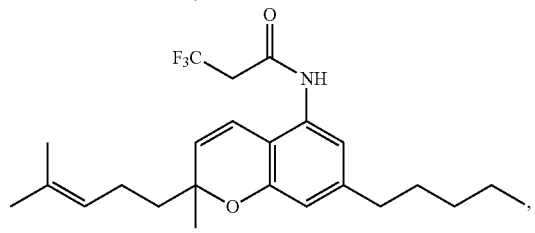

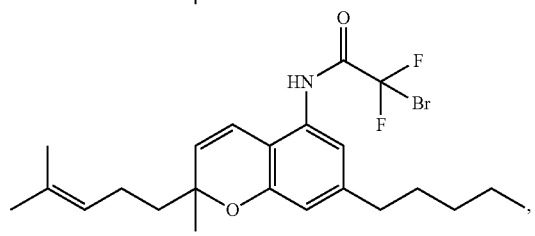

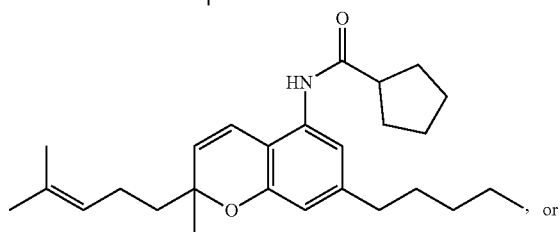

, or

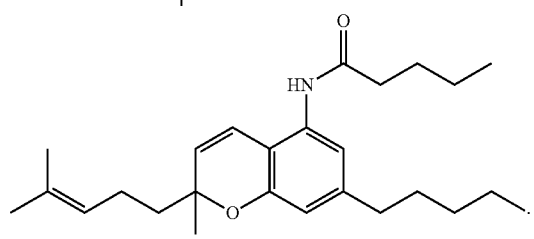

.

8. A method for treating cancer, the method comprising: administering a therapeutically effective amount of a compound having the structure:

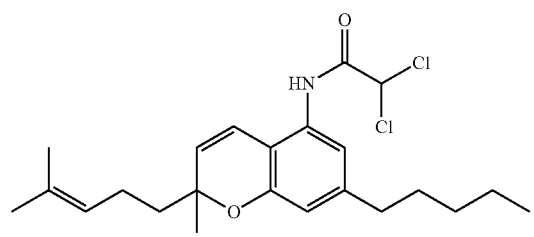 [SMILES: CCCCCc1cc(NC(=O)C(Cl)Cl)c2c(c1)OC(C)(CCC=C(C)C)C=C2]

to a patient in need, wherein the cancer is selected from leukemia, non-small cell lung cancer (NSCLC), colon cancer, CNS cancer, melanoma, ovarian cancer, renal cancer, prostate cancer, or breast cancer.

9. A method for treating cancer, the method comprising: administering a therapeutically effective amount of a compound having the structure:

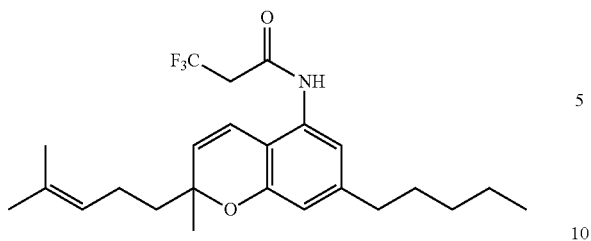
to a patient in need, wherein the cancer is prostate cancer.
10. The method according to claim 8, wherein the method further comprises administering an additional therapy for treating the cancer.
11. The method according to claim 9, wherein the method further comprises administering an additional therapy for treating the cancer.
* * * * *

UNITED STATES PATENT AND TRADEMARK OFFICE
CERTIFICATE OF CORRECTION

| | | |
|---|---|---|
| PATENT NO. | : 12,466,801 B2 | Page 1 of 1 |
| APPLICATION NO. | : 19/069464 | |
| DATED | : November 11, 2025 | |
| INVENTOR(S) | : Wayne Wesley Harding et al. | |

It is certified that error appears in the above-identified patent and that said Letters Patent is hereby corrected as shown below:

In the Claims

<u>At Column 31</u>
In Claim 2, Line 23, please delete "Riis" and replace with -- $R_1$ is --.

In Claim 5, Line 30, please delete "Riis" and replace with -- $R_1$ is --.

In Claim 6, Line 32, please delete "Riis" and replace with -- $R_1$ is --.

Signed and Sealed this
Sixteenth Day of December, 2025

John A. Squires
*Director of the United States Patent and Trademark Office*